United States Patent
Engineer

(10) Patent No.: US 10,356,458 B2
(45) Date of Patent: Jul. 16, 2019

(54) CONTROLLING CONTENT PRESENTATION AND DISPLAY OF PROGRAM INFORMATION IN AN ELECTRONIC PROGRAM GUIDE

(71) Applicant: The DIRECTV Group, Inc., El Segundo, CA (US)

(72) Inventor: Hiten Engineer, Torrance, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days.

(21) Appl. No.: 15/451,077

(22) Filed: Mar. 6, 2017

(65) Prior Publication Data

US 2018/0255340 A1 Sep. 6, 2018

(51) Int. Cl.
*G06F 3/00* (2006.01)
*H04N 21/262* (2011.01)
*H04N 21/482* (2011.01)
*H04N 21/45* (2011.01)

(52) U.S. Cl.
CPC ... *H04N 21/26283* (2013.01); *H04N 21/4532* (2013.01); *H04N 21/4821* (2013.01); *H04N 21/4826* (2013.01)

(58) Field of Classification Search
CPC ............. H04N 21/26283; H04N 21/4532
See application file for complete search history.

(56) References Cited

U.S. PATENT DOCUMENTS

| | | | |
|---|---|---|---|
| 7,937,725 B1 | 5/2011 | Schaffer et al. | |
| 7,984,467 B2 | 7/2011 | Hansen-turton | |
| 8,046,797 B2 | 10/2011 | Bentolila et al. | |

(Continued)

FOREIGN PATENT DOCUMENTS

| | | |
|---|---|---|
| GB | 2343075 B | 2/2003 |
| WO | 0040016 A1 | 7/2000 |

(Continued)

OTHER PUBLICATIONS

Lim et al., "Automatic user preference learning for personalized electronic program guide applications." Journal of the American Society for Information Science and Technology 58.9 (2007): 1346-1356. 11 pages.

(Continued)

*Primary Examiner* — Olugbenga O Idowu
(74) *Attorney, Agent, or Firm* — Amin, Turocy & Watson, LLP

(57) ABSTRACT

Presentation of content and display of program information in an electronic program guide (EPG) can be controlled. A content manager component of a device can control or modify display of program information in the EPG based on user information selecting favorite programs on various channels or applications. Based on the modified EPG, the content manager component can switch to respective channels or applications presenting respective favorite programs at respective times of presentation of the respective favorite programs. The content manager component also can modify the EPG to prominently display a defined number of most popular programs for respective time slots in the EPG to facilitate presentation of popular programs to the user via the EPG and selection of popular programs by the user.

20 Claims, 11 Drawing Sheets

(56) References Cited

U.S. PATENT DOCUMENTS

| | | | |
|---|---|---|---|
| 8,365,225 B2 | 1/2013 | Mccarthy et al. | |
| 8,490,136 B2 | 7/2013 | Cox et al. | |
| 8,756,619 B2 | 6/2014 | Bolyukh et al. | |
| 8,984,559 B2 | 3/2015 | Kothari | |
| 9,456,241 B2 | 9/2016 | Bayrakeri et al. | |
| 2003/0131355 A1 | 7/2003 | Berenson et al. | |
| 2007/0220543 A1 | 9/2007 | Shanks et al. | |
| 2009/0158162 A1 | 6/2009 | Imai | |
| 2009/0271826 A1* | 10/2009 | Lee | H04N 5/44543 725/46 |
| 2010/0064320 A1 | 3/2010 | Angiolillo et al. | |
| 2010/0169927 A1* | 7/2010 | Yamaoka | H04N 5/44543 725/46 |
| 2013/0074109 A1 | 3/2013 | Skelton et al. | |
| 2014/0130096 A1 | 5/2014 | Krishnamurthy | |
| 2014/0223480 A1* | 8/2014 | Berry | H04N 21/4668 725/40 |
| 2015/0113548 A1 | 4/2015 | Stern et al. | |
| 2015/0358661 A1 | 12/2015 | Navarro et al. | |
| 2016/0119684 A1 | 4/2016 | Flores et al. | |
| 2016/0227279 A1 | 8/2016 | Fang et al. | |

FOREIGN PATENT DOCUMENTS

| | | |
|---|---|---|
| WO | 0040027 A1 | 7/2000 |
| WO | 0201871 A1 | 1/2002 |
| WO | 0230111 A2 | 4/2002 |

OTHER PUBLICATIONS

Smyth et al., "Personalized electronic program guides for digital TV." Ai Magazine 22.2 (2001): 89. 10 pages.

Oh et al., "Comparison of techniques for time aware TV channel recommendation." IEEE SCIS&ISIS 2014, Kitakyushu, Japan, Dec. 3-6, 2014, 4 pages.

Baudisch et al., "TV scout: Guiding users from printed TV program guides to personalized TV recommendation." Lecture Notes in Computer Science 2347 (2002): 10 pages.

\* cited by examiner

CONTROLLING CONTENT PRESENTATION AND DISPLAY OF PROGRAM INFORMATION IN AN ELECTRONIC PROGRAM GUIDE

TECHNICAL FIELD

This disclosure relates generally to information presentation, e.g., to controlling content presentation and display of program information in an electronic program guide.

BACKGROUND

Typically, in an electronic program guide relating to programs available for viewing, the programs of one channel are displayed from left to right in a row based on respective times the programs are being presented, the programs of another channel are displayed from left to right in another row based on respective times the programs are being presented, and so on. Usually, a subset of channels and a subset of times of program presentations of the electronic program guide are displayed on a display screen of, for example, a television.

The above-described description is merely intended to provide a contextual overview relating to presentation of information, and is not intended to be exhaustive.

DETAILED DESCRIPTION

Figure 1:
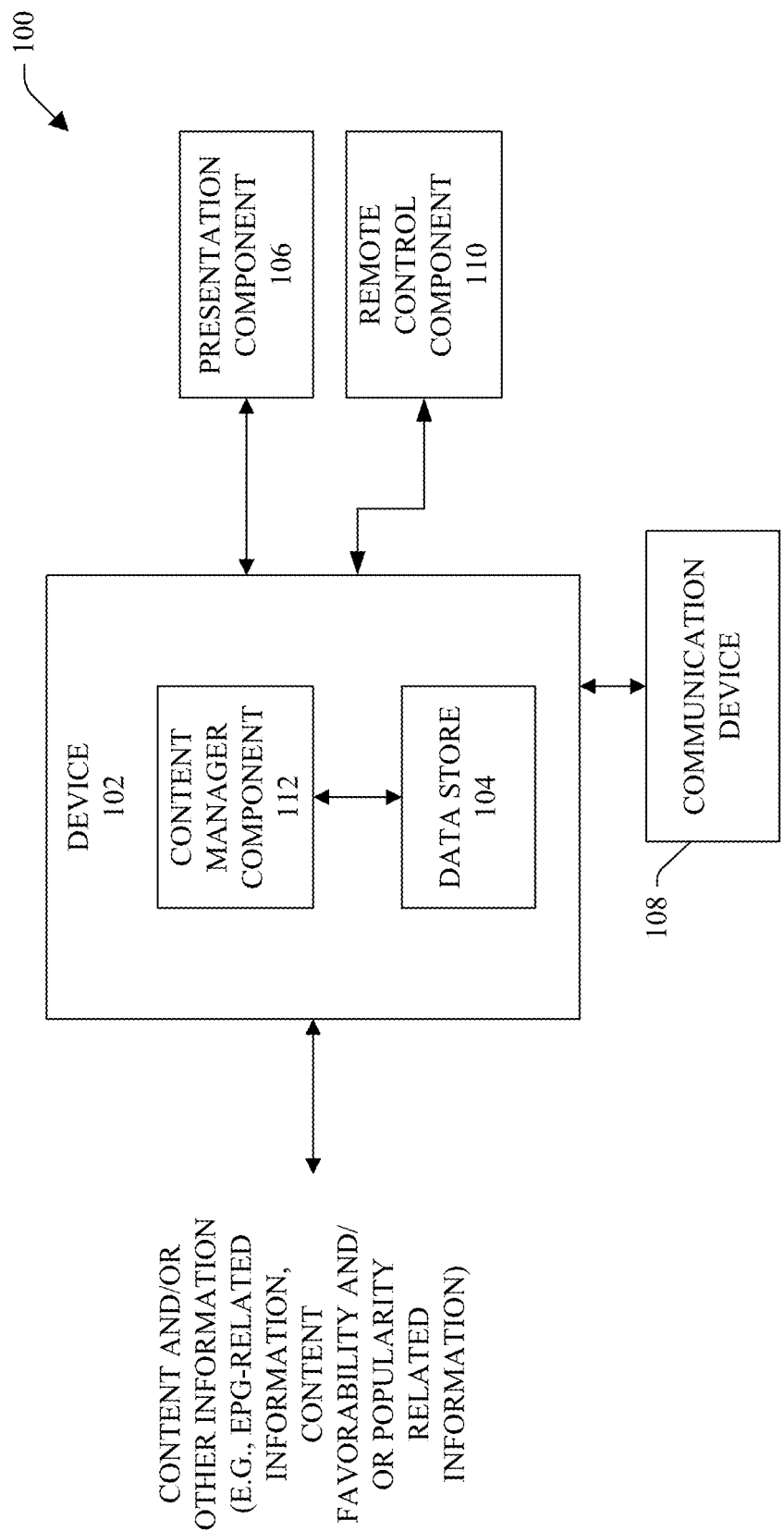
FIG. 1 illustrates a block diagram of an example system that can control presentation of content (e.g., programs) and presentation of program information in an electronic programming guide (EPG), in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Typically, in an electronic program guide relating to programs available for viewing, the programs of one channel are displayed from left to right in a row based on the respective times the programs are being presented, the programs of another channel are displayed from left to right in another row based on the respective times the programs are being presented, and so on. Usually, a subset of channels and a subset of times of program presentations of the electronic program guide are displayed on a display screen of, for example, a television.

Programs that are popular with (e.g., frequently watched by) viewers usually can be scattered in different places in the guide grid of the electronic programming guide. A user may be able to set channels as favorite channels, however, setting a channel as a favorite can result in the display of all of the programs of that channel in the electronic program guide, wherein some of the programs on a favorite channel may not be favorite programs of the user. There also may be a feature that can list the most popular current shows on an active channel (e.g., a channel currently being watched). However, such a feature only lists most popular shows on the active channel and also does not list the most popular shows for all timeslots.

To that end, techniques for controlling and modifying presentation of content (e.g., programs) and display of program information in an electronic program guide (EPG) are presented. A device (e.g., a set-top box (STB) or set-top unit (STU)) can comprise a content manager component that can control or modify a display of program information in the EPG based at least in part on user information selecting favorite programs on various channels or applications. The user information can be received by the content manager component via an interface on the device, interface on a presentation component (e.g., television (TV), Internet Protocol (IP) TV (IPTV), or other display device) associated with the device, interface on a communication device (e.g., mobile phone, computer, electronic pad or tablet, electronic eyewear, . . . ) associated with the device, or interface on a remote control component associated with the device. Based at least in part on the modified EPG, the content manager component can switch (e.g., automatically switch) to respective channels or applications (e.g., Hulu, Netflix, YouTube, . . . ) presenting respective favorite programs at respective times of presentation of the respective favorite programs. The content manager component also can modify the EPG to prominently display a defined number (e.g., 10, 15, 20, or other desired number) of most popular programs for respective time slots in the EPG to facilitate presentation of popular programs to the user via the modified EPG and selection of popular programs, via the modified EPG, by the user.

These and other aspects and embodiments of the disclosed subject matter will now be described with respect to the drawings.

Referring now to the drawings, FIG. 1 illustrates a block diagram of an example system 100 that can control presentation of content (e.g., programs) and presentation of program information in an EPG, in accordance with various aspects and embodiments of the disclosed subject matter. The system 100 can comprise a device 102 that can receive content (e.g., video or audio content) from one or more content sources, such as, for example, one or more content provider devices (not shown in FIG. 1) associated with (e.g., communicatively connected to) the device 102 (e.g., via a communication network).

The device 102 can be or comprise a media device (e.g., STB or STU). It is to be appreciated and understood that, while the device 102, is often described herein as being as an STB or STU, the disclosed subject matter is not so limited, as, in accordance with various embodiments, the device 102 can be or can comprise, for example, a mobile phone (e.g., smart phone), a computer, a TV (e.g., smart TV), electronic eyewear, electronic watch (e.g., smart watch), electronic gaming device, or other type of communication device.

The device 102 can be employed to record or store the content in a data store 104 of (or associated with) the device 102. The content can be stored in the data store 104, for example, for future presentation by the device 102 and a presentation component 106 (e.g., TV, IPTV, or other display device) or other communication device 108 (e.g., mobile phone, computer, electronic pad or tablet, electronic eyewear, . . . ) associated with the device 102. The device 102 also can stream the content for presentation via the presentation component 106 or other communication device 108 associated with the device 102.

A user can use (e.g., manipulate) buttons, controls, menus, etc., on an interface of the device 102, buttons, controls, menus, etc., on an interface of the presentation component 106, buttons, controls, menus, etc., on an interface of the communication device 108, or buttons, controls, menus, etc., on an interface of a remote control component 110 to facilitate controlling the receiving, streaming, storing, processing, and/or presenting of the content via the device 102. The remote control component 110 can be associated with the device 102 and/or the presentation component 106.

The device 102 can comprise or be associated with a content manager component 112 that can control the generation, arrangement, customization, and/or presentation of an EPG to a user, in accordance with user preferences of the user and/or defined favorability criteria. The content manager component 112 can determine the respective programs associated with the respective channels or sources (e.g., channels or sources providing the respective programs) for respective time periods based at least in part on the user preferences of the user and/or the defined favorability criteria.

The defined favorability criteria can relate to the favorite programs (e.g., items of content) of the user (e.g., as indicated by the user through program selections by and/or user preferences of the user) and/or popular programs (e.g., programs that meet a defined level of popularity relative to other programs) among a group of users, wherein such group may or may not include the user. For example, the defined favorability criteria can relate to the favorability, as determined by the user (e.g., based on a user preference(s) or selection(s)), of presenting a particular program, which can be presented via a particular channel or source, at a particular time period, as opposed to, presenting another program, which is presented via another channel or source, at that particular time period.

As another example, the defined favorability criteria, additionally or alternatively, can relate to the relative favorability or popularity, as determined by or from a plurality of users, of certain programs over other programs overall or with respect to a particular time period. For instance, with regard to a group of users (e.g., associated with a defined geographical region(s) and/or demographic(s)), the content manager component 112 (or another component) can determine the respective popularity of respective programs, for example, based at least in part on respective ratings (e.g., program or TV ratings) of the respective programs. The respective ratings of the respective programs can be determined or identified, for example, by one or more content rating sources, wherein the respective ratings of the respective programs can be based at least in part on the Nielsen ratings, respective ratings of respective programs based at least in part on data obtained from STBs of users, respective ratings of respective programs that can be obtained from social media sources (e.g., Facebook, Twitter, YouTube, . . . ), ratings or supplementary data relating to content popularity obtained from other sources (e.g., TiVo, The Right Audience (TRA), Rentrak Corp., . . . ), etc.

In some implementations, the content manager component 112 can generate an EPG based at least in part on information received from a content provider source (e.g., cable or satellite service provider, or other content service provider). The content manager component 112 can facilitate presenting the EPG to the user via an interface (e.g., a display screen of the presentation component 106 or a display screen of the communication device 108). The user can decide that it is desirable to modify or customize the EPG, for example, to customize or re-arrange all or at least a portion of the EPG to present one or more programs that the user considers favorite programs of the user and/or one or more programs that are determined to be popular programs among a group of users, in accordance with the defined favorability criteria.

For instance, the content manager component 112 can receive information (e.g., user or input information) regarding user preferences, selections of favorite programs, arranging or rearranging of favorite programs (e.g., in a desired ranking or order), and/or other information, via an interface of the device 102, an interface of the presentation component 106, an interface of the communication device 108, an interface of the remote control component 110, and/or an interface of the application. The user can manipulate controls on an interface to select (e.g., by entering or inputting selection information in response to manipulating the controls) certain programs (e.g., items of content, such as TV programs, or other programs or presentations) as favorite programs of the user with respect to certain time periods, wherein the certain programs can be associated with (e.g., presented by) certain content provider channels or sources.

The user can, for example, select and rank, via an interface, the certain programs associated with respective time periods from most favorite to second most favorite to third most favorite, and so on, as desired by the user. As desired, the user also can provide information (e.g., EPG customization information), via an interface, to indicate a number (e.g., 3, 4, 5, or other desired number) of favorite programs to be presented in the EPG for a given time period.

The content manager component 112 can receive the information relating to the selections and rankings of programs made by the user and/or the other information (e.g., EPG customization information) from the interface of the device 102, the presentation component 106, the communication device 108, the remote control component 110, and/or the application. The content manager component 112 can analyze the information, and can customize, tailor, or rearrange the presentation of programs in the EPG (e.g., presentation of information relating to the programs in the EPG) based at least in part on the results of analyzing such information, in accordance with the defined favorability criteria.

Figure 2:
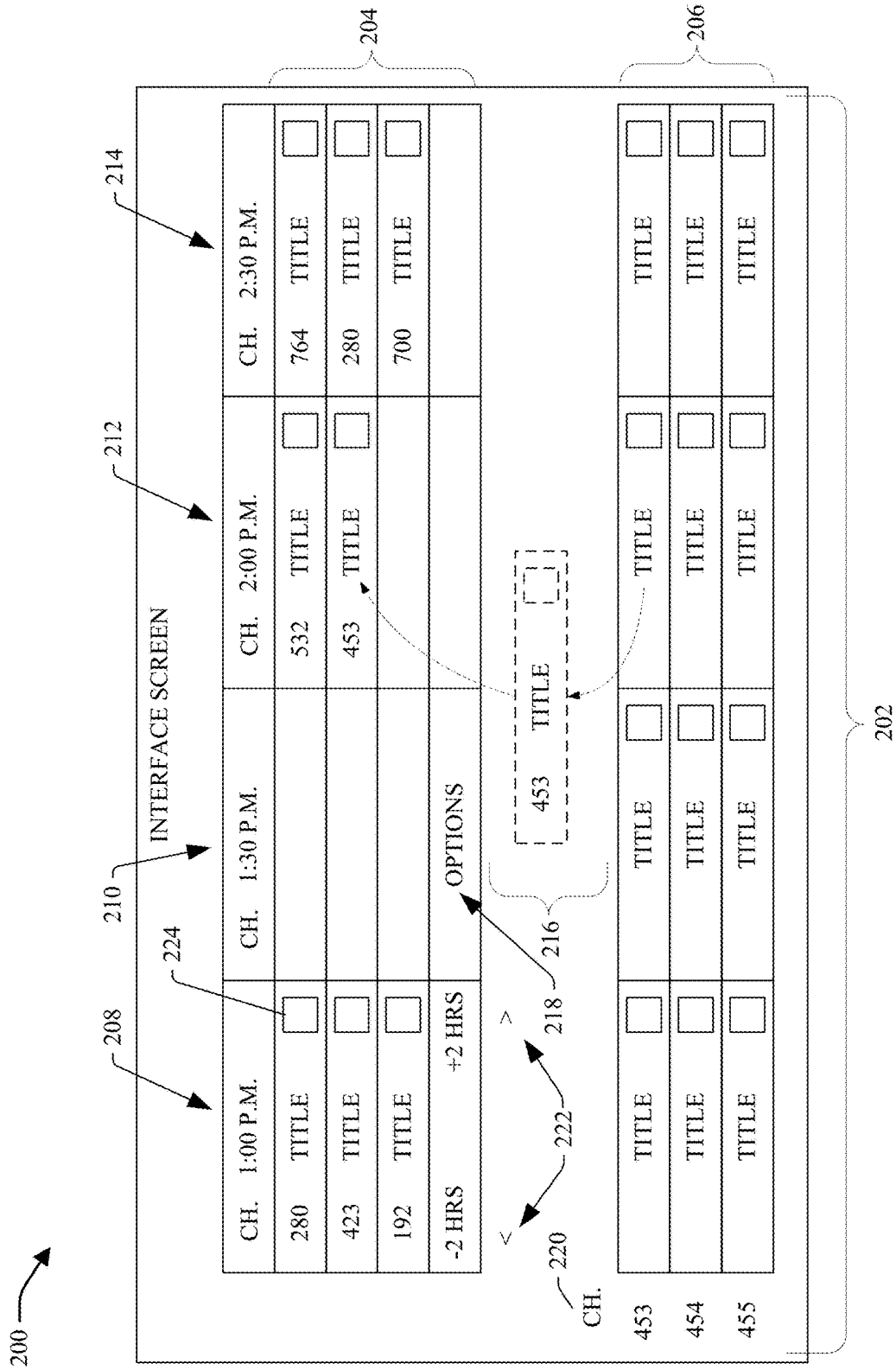
FIG. 2 depicts a diagram of an example interface screen that can facilitate modification of an EPG to include a section of favorite programs for respective time periods, in accordance with various aspects and embodiments of the disclosed subject matter.

Referring briefly to FIG. 2 (along with FIG. 1), FIG. 2 depicts a diagram of an example interface screen 200 that can facilitate modification of an EPG to include a section of favorite programs for respective time periods, in accordance with various aspects and embodiments of the disclosed subject matter. The content manager component 112 can facilitate generating the interface screen 200 and presentation of the interface screen 200 via a display screen of the device 102, a display screen of the presentation component 106, or a display screen of the communication device 108.

The interface screen 200 can comprise and/or present various information, all or part of an EPG 202, data fields, menus (e.g., pop-up menu, drop-down menu, ... ), buttons, and/or controls, etc., to facilitate selecting programs as favorites for respective time periods, modifying the EPG 202 to have a desired (e.g., a desired number of) favorite programs and/or popular programs for respective time periods presented in the EPG 202, and/or make other selections or modifications to or in connection with the EPG 202 (e.g., selection of modification to have automatic execution of EPG 202 to have certain favorite programs automatically presented at respective time periods). The user can use (e.g., manipulate) buttons, controls (e.g., drag-and-drop controls), and/or menus on a display screen (e.g., touch screen), another interface, a keyboard or keypad, etc., of the device 102, presentation component 106, communication device 108, or remote control component 110 to facilitate selecting (e.g., clicking on to select) programs as favorites for respective time periods, modifying the EPG 202 to have a desired (e.g., a desired number of) favorite programs and/or popular programs for respective time periods presented in the EPG 202, and/or make other selections or modifications to or in connection with the EPG 202.

In some implementations, the EPG 202 can comprise a first portion 204 that can comprise information (e.g., title of the program, channel that is providing the program, and/or other information) relating to favorite programs for respective time periods, as selected by the user, and a second portion 206 that can comprise information (e.g., program-related information) relating to programs associated with certain channels or sources for the respective time periods. For instance, in response to selections and other commands made by the user, the content manager component 112 can modify an original EPG to generate the modified EPG 202, wherein the original EPG can merely present information regarding respective programs presented by respective channels during respective time periods. As illustrated in the interface screen 200, the content manager component 112 has modified the EPG 202 (e.g., the modified EPG), in response to the user's selections and commands, to present the top three favorite programs of the user for various time periods. For instance, at 1:00 p.m. (208), the EPG 202 shows the program on channel 280 as the most favorite program of the user, the program on channel 423 as the second most favorite program of the user, and the program on channel 192 as the third most favorite program of the user, for that time period. At 1:30 p.m. (210), the user has not selected any favorite programs, so the regions (e.g., time slots or cells) of the first portion 204 associated with 1:30 p.m. (210) can remain blank. At 2:00 p.m. (212), the EPG 202 shows the program on channel 532 as the most favorite program of the user and the program on channel 453 as the second most favorite program of the user for that time period, and the third slot associated with the 2:00 p.m. (212) time period can remain blank. At 2:30 p.m. (214), the EPG 202 depicts the program on channel 764 as the most favorite program of the user, the program on channel 280 as the second most favorite program of the user, and the program on channel 700 as the third most favorite program of the user, for that time period.

One way the user can add a program as a favorite program in the first portion 204 of the EPG 202 is to use a control or component (e.g., a mouse or trackpad and ball) to select the program in the second portion 206 of the EPG 202, and drag and drop the program in the desired favorites location in the first portion 204 (e.g., favorites section) of the EPG 202, as illustrated at (216), where the program on channel 453 at 2:00 p.m. is being dragged (e.g., and copied) and dropped into the second favorite position for the 2:00 p.m. (212) time period. The program (e.g., program information of the program) has been copied, so it still remains in its time and channel location in the second portion 206 of the EPG 202. The program now also appears as a second favorite program of the user at 2:00 p.m. (212).

Additionally or alternatively, the user can use other controls, buttons, menus, etc., to facilitate adding or removing programs to or from, or rearranging locations of programs in, the first portion 204 (e.g., favorites section) of the EPG 202. For example, the user can use a control or button to select or highlight a program in the second portion 206 of the EPG 202, open a menu (e.g., via the options control 218), select a favorites control or command (e.g., "add to favorites" control or command), and/or other controls or commands (e.g., control or command to have the program inserted into the desired favorites ranking in the first portion 204 of the EPG 202), to facilitate adding a program to a desired location (e.g., slot) in the first portion 204 of the EPG 202. The user can select a program as a favorite program as the user is watching the program (e.g., by selecting the program in the EPG while watching the program) or can search in the program listings of the EPG for the program to select it as a favorite.

The content manager component 112 can generate the second portion 206 of the EPG 202 to have the programs presented in accordance with the respective channels or sources associated with the respective programs and the respective time periods at which the respective programs are being presented or are available. The channels can be presented in the second portion 206 of the EPG 202 from lowest to highest, for example. As illustrated in the interface screen 200 of FIG. 2, the second portion 206 of the EPG can present information regarding the respective programs on the respective channels (CH.) 453, 454, and 455 (220) at the respective time periods (e.g., 1:00 p.m. (208), 1:30 p.m.

(210), 2:00 p.m. (212), and 2:30 p.m. (214)). The content manager component 112 can facilitate providing controls (e.g., scrolling controls) that the user can use (e.g., manipulate) to scroll or rotate through the different channels and different programs in the second portion 206 of the EPG 202.

The content manager component 112 also can provide other controls to facilitate using or adjusting the EPG 202. For example, the content manager component 112 can provide a time adjustment control 222 that the user can use to move or adjust the time periods presented in the first portion 204 and/or second portion 206 of the EPG 202, so that the user can view a desired time period(s) and information regarding the programs associated with the desired time period(s).

In some implementations, the respective slots (e.g., EPG grid slots or cells) associated with the respective programs in the EPG 202 can provide other information to the user. For example, the slots can comprise respective information regions, such as information region 224 (e.g., information area, information icon) that can comprise certain program-related information regarding the program associated with the slot. The information region 224 can provide program-related information that can indicate whether the associated program is in high definition (HD) or not, whether the program is a three-dimensional (3-D) program, a type and/or sub-type of program (e.g., news, comedy, drama, movie (e.g., comedy movie, drama movie), sports (e.g., baseball, football, . . . ), . . . ), a content rating of a program (e.g., G, PG, PG-13, R, . . . ), etc. As an example, the information region 224 can comprise program-related information, such as an abbreviation, that can indicate the type of program (e.g., "N" for news, "C" for comedy, "D" for drama, "S" for sports, . . . ). As another example, the information region 224 can be an icon that can be highlighted (e.g., lit up or colored) or not highlighted (e.g., dark) to indicate certain program-related information (e.g., HD when highlighted, not HD when not highlighted; 3-D when highlighted, or not 3-D when not highlighted; . . . ) regarding the program. Additionally or alternatively, the information region 224 can be an area or icon that can be selected to present additional program-related information regarding the program, wherein the additional program-related information can comprise, for example, a summary or short description of the program, the type of program, the length of the program, the year the program was created, whether the program is a repeat presentation of the program or a first presentation of the program, whether the program is in HD and/or 3-D, actors or participants in the program, and/or other desirable information regarding the program.

The content manager component 112 can store information (e.g., information relating to favorite programs, user preferences, . . . ) relating to the EPG 202 (e.g., the modified or customized EPG of the user) in a user profile associated with the user, wherein the user profile associated with the user can be stored in a data store 104 of or associated with the device 102. The content manager component 112 can generate and manager respective user profiles of respective users, and can store the respective user profiles of the respective users in the data store 104. The content manager component 112 can retrieve a particular user profile of a particular user from the data store 104 to facilitate generating the particular EPG 202 (e.g., modified or customized EPG), as (previously) modified by the particular user, and can facilitate presenting the particular EPG 202 on the presentation component 106 or communication device 108 associated with the particular user.

In certain implementations, the content manager component 112 can facilitate enabling a user to modify or customize one or more EPGs based at least in part on favorite programs of the user, popular programs among a group of users, and/or types or sub-types of programs (e.g., genre or sub-genres of programs). For instance, based at least in part on information received from a user to modify an EPG, the content manager component 112 can generate or modify a first EPG or first part of an EPG to present respective favorite comedy programs associated with respective time periods, a second EPG or second part of an EPG to present respective favorite drama programs associated with the respective time periods, and/or a third EPG or third part of an EPG to present respective favorite movies associated with the respective time periods, etc. The content manager component 112 can store the respective modified EPGs or parts of the modified EPG in the user profile associated with the user, and can store the user profile in the data store 104.

As desired by the user, the EPG 202 can be executed to facilitate presenting desired programs (e.g., most favorite programs, second most favorite programs, a desired mix of favorite programs, a desired mix of favorite and/or non-favorite programs, . . . ) at desired time periods. Based at least in part on a command received from the user or a user preference of the user indicating the EPG 202 is to be executed, the content manager component 112 can execute the EPG 202, or portion thereof, to present a portion of the programs (e.g., favorite programs) in the EPG 202. For example, based at least in part on a command or user preference (e.g., from the user profile) that indicates the most favorite (e.g., highest ranked) programs in the first portion 204 of the EPG 202 are to be presented at their respective time periods, the content manager component 112 can execute the EPG 202 to have the respective programs (e.g., program on channel 280 at 1:00 p.m., program on channel 532 at 2:00 p.m., and program on channel 764 at 2:30 p.m.) presented (e.g., automatically presented), via the device 102 and associated presentation component 106 or communication device 108, to the user. The content manager component 112 can switch the channel on the device 102 from one channel (e.g., 532) to another channel (e.g., 764) when one favorite program ends (e.g., the program on channel 532 ends at 2:30 p.m.) and the next favorite program begins (e.g., the program on channel 764 begins at 2:30 p.m.). With regard to time periods (e.g., 1:30 p.m. in the first portion 204) where the user has not selected a favorite program, the content manager component 112 can maintain the current channel (e.g., 280) on the device 102 associated with the program that was just presented, or can switch to another desired or default channel, in accordance with the user preference or commands of the user.

As another example, the user may desire to have the second most favorite programs of the user presented at respective time periods, as opposed to the most favorite programs of the user. In response to, for instance, a command received from the user to present the second most favorite programs of the user at the respective time periods, the content manager component 112 can execute the EPG 202 to present (e.g., automatically present) the second most favorite programs of the user in the first portion 204 of the EPG 202.

As still another example, the user may desire to have a mix of various favorite programs of the user presented at respective time periods, as opposed to the most favorite programs of the user. For instance, the user can desire to view the most favorite program (e.g., program on channel 280) of the user at 1:00 p.m., the second most favorite program (e.g., program on channel 453) of the user at 2:00 p.m., and the third most favorite program (e.g., program on channel 700) of the user at 2:30 p.m. The user can use the controls associated with the interface screen 200, via the interface of the device 102, presentation component 106, communication device 108, and/or remote control component 110, to select (e.g., click on to select and highlight) the respective favorite programs in the first portion 204 of the EPG 202. In response to receiving such selection information, the content manager component 112 can execute the EPG 202 to present (e.g., automatically present) the most favorite program associated with the 1:00 p.m. time period (208) at 1:00 p.m., present (e.g., automatically present) the second most favorite program associated with the 2:00 p.m. time period (212) at 2:00 p.m., and present (e.g., automatically present) the third most favorite program associated with the 2:30 p.m. time period (214) at 2:30 p.m., via the device 102 and associated presentation component 106 or communication device 108. As desired, the user also can select a program (e.g., program on channel 455) in the EPG 202 that is not a favorite program of the user for presentation (e.g., automatic presentation) instead of a favorite program associated with a particular time period or for presentation at a time period (e.g., 1:30 p.m. (210)) for which no favorite program has been selected.

Figure 3:
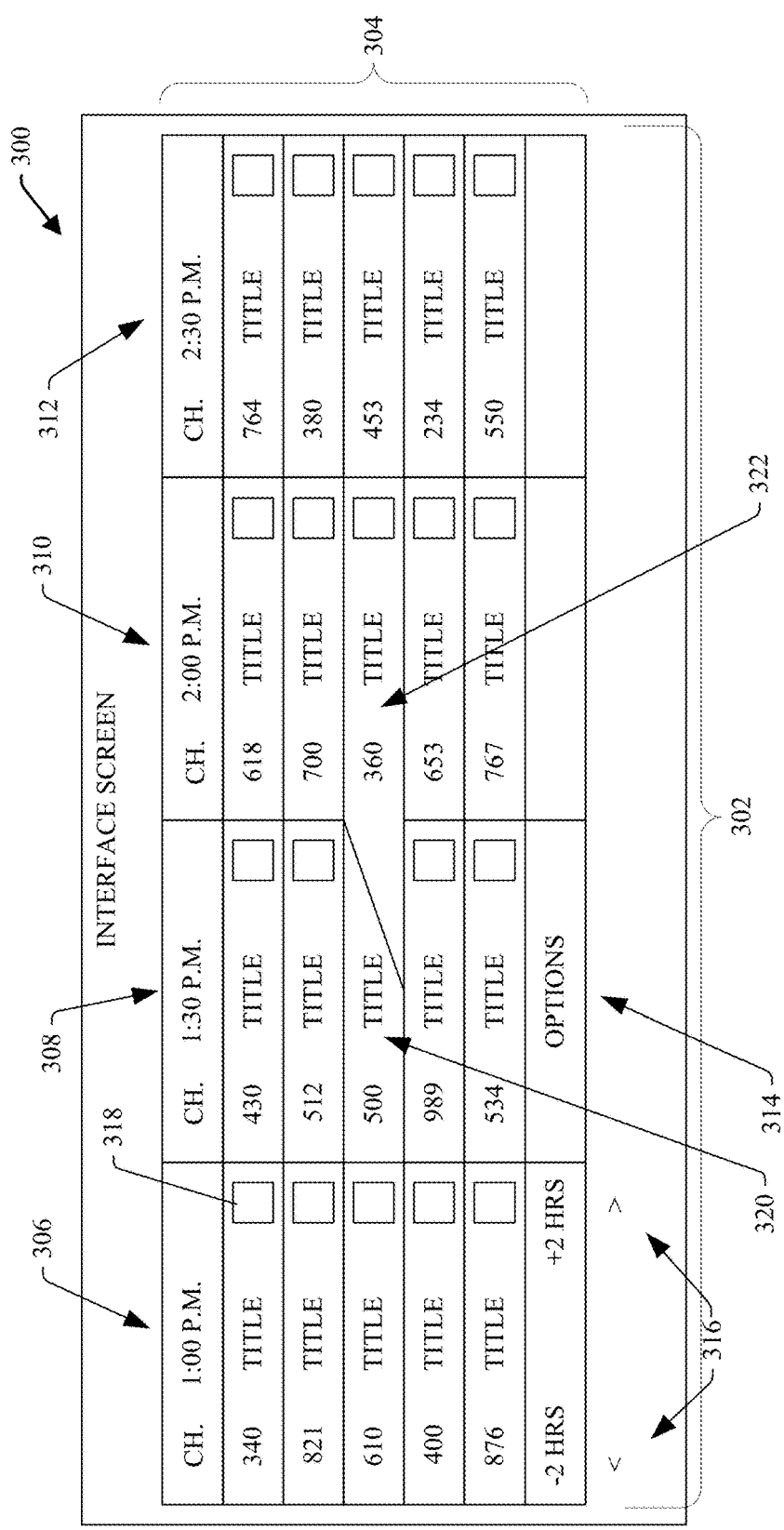
FIG. 3 presents a diagram of another example interface screen that can facilitate modification of an EPG to comprise a section of popular programs for respective time periods, in accordance with various aspects and embodiments of the disclosed subject matter.

Turning briefly to FIG. 3 (along with FIG. 1), FIG. 3 presents a diagram of another example interface screen 300 that can facilitate modification of an EPG to comprise a section of popular programs for respective time periods, in accordance with various aspects and embodiments of the disclosed subject matter. The content manager component 112 can facilitate generating the interface screen 300 and presentation of the interface screen 300 via a display screen of the device 102, a display screen of the presentation component 106, or a display screen of the communication device 108.

The interface screen 300 can comprise or present an EPG 302 that can be generated by the content manager component 112 and can comprise popular programs, such as programs that have been determined to be popular among a group of users, which may or may not include the user utilizing the EPG 302. The interface screen 300, as generated by the content manager component 112, can comprise and/or present various information, buttons, controls, and/or menus (e.g., drop-down menus), etc., to facilitate modifying the EPG 302 to present popular programs associated with respective time periods (in addition to or instead of presenting programs in the EPG based on the respective channels and respective time periods of the programs), select the number (e.g., 3, 4, 5, . . . 10, . . . 15, . . . 20, or other desired number) of popular programs to be presented for respective time periods, select types or sub-types of popular programs for inclusion in the EPG 302, etc. The interface screen 300 can be presented (e.g., as facilitated by the content manager component 112) via a display screen of the device 102, a display screen of the presentation component 106, or a display screen of the communication device 108, as an alternative to, or in addition to, the interface screen 200, for example. The user can use (e.g., manipulate) buttons or controls on a display screen (e.g., touch screen), another interface, a keyboard or keypad, etc., of the device 102, presentation component 106, communication device 108, or remote control component 110 to facilitate modifying the EPG 302 to present popular programs associated with respective time periods (in addition to or instead of presenting programs in the EPG based on the respective channels and respective time periods of the programs), select the number of popular programs to be presented for respective time periods, select types or sub-types of popular programs for inclusion in the EPG 302, etc.

As depicted in the EPG 302 of FIG. 3, the content manager component 112 has generated the EPG 302 to include the top five most popular programs associated with the respective time periods, for example, based at least in part on selections by the user and/or a user preference of the user (e.g., from the user profile of the user), in accordance with the defined favorability criteria, which can be include defined popularity criteria. The respective popularity of programs can be determined by the content manager component 112 or another component(s) based at least in part on popularity rating information or other information that can indicate the respective popularity of respective programs. The content manager component 112 or another component(s) can determine the respective popularity of programs with regard to or based at least in part on a geographic region(s) (e.g., country, state, region of a country, metropolitan area, . . . ) and/or demographic characteristic(s) (e.g., gender (e.g., male, female), age (e.g., under 18, 19-24, 25-49, 50-64, or other desired age groups), income, profession or employment, education level (e.g., college educated, high school educated), . . . ) associated with users. Additionally or alternatively, the content manager component 112 or another component(s) can determine the respective popularity of programs with regard to respective types or sub-types of programs (e.g., in accordance with a user preference or request of the user).

The respective ratings of the respective programs can be determined or identified, for example, by one or more content rating sources or the content manager component 112, wherein the respective ratings of the respective programs can be based at least in part on the Nielsen ratings, respective ratings of respective programs based at least in part on data obtained from STBs of users, respective ratings of respective programs that can be obtained from social media sources (e.g., Facebook, Twitter, YouTube, . . . ), ratings or supplementary data relating to content popularity obtained from other sources (e.g., TiVo, TRA, Rentrak Corp., . . . )), etc. The content manager component 112 can utilize (e.g., directly utilize) the ratings information from a rating source to determine the respective popularity of respective programs, or can analyze the ratings information from one or more rating sources to determine the respective popularity of respective programs, in accordance with (e.g., as specified by) the defined favorability criteria.

The respective ratings of the respective programs can be determined or identified dynamically or over a defined period of time (e.g., a week, a month, or other desired time period) by one or more content rating sources or the content manager component 112. For example, a content rating source or the content manager component 112 can determine the respective ratings of respective programs dynamically based at least in part on information (e.g., program selection or tuning information) received from STBs and/or other devices. For instance, if a significant number of STBs switch channels or are tuned to a particular program being presented at a particular time period and a smaller number of STBs are set to another program for that particular time period, a content rating source or the content manager component 112 can receive information indicating that a significant number of STBs are set to the particular program, while a lower number of STBs are set to the other program, and the content rating source or content manager component 112 can dynamically rank the particular program as having a higher popularity than the other program (even if the other program is otherwise considered a more popular program than the particular program in popularity rankings over a longer time period (e.g., a month)).

In some implementations, the content manager component 112 can apply respective weights to respective ratings information (e.g., respective preliminary or intermediary program rankings; respective program viewer or market share data) received from respective data sources (e.g., rating sources), in accordance with the defined favorability criteria and/or user preferences of a user. For example, when in accordance with the defined favorability criteria and/or a user preference, the content manager component 112 can apply a higher or heavier weight to first rating information (e.g., Nielsen ratings) from a first rating source (e.g., Nielsen Holdings PLC) and a lower weight to second rating information from a second rating source (e.g., a social media website).

In some instances, first program ratings information (e.g., program rankings) of a first data source can be in a different format from the second programs rating information of a second data source. For instance, the first data source can rank all programs over all time periods relative to each other, whereas the second data source can rank, with respect to each particular time period, respective programs associated with respective time periods relative to each other (e.g., rank programs presented at 8:00 p.m. on Thursday nights relative to each other). The content manager component 112 can facilitate analyzing the respective different types of ratings information from the different data sources, and weighting and/or translating the respective different types of ratings information from the different data sources to facilitate determining respective popularity rankings of respective programs associated with respective time periods relative to each other, in accordance with the defined favorability criteria and/or a user preference(s).

With regard to the EPG 302 (e.g., customized or modified EPG), the content manager component 112 can generate the EPG 302 to include a popular program portion 304 of the EPG 302 that can comprise the top five popular programs of the respective time periods. For instance, the EPG 302 can comprise the top five most popular programs associated with the 1:00 p.m. time period (306), the top five most popular programs associated with the 1:30 p.m. time period (308), the top five most popular programs associated with the 2:00 p.m. time period (310), and the top five most popular programs associated with the 2:30 p.m. time period (312).

The content manager component 112 can facilitate presenting all or a portion of the menus, buttons, controls, etc., for example, via the options control 314. The content manager component 112 also can provide other controls to facilitate using or adjusting the EPG 302. For example, the content manager component 112 can provide a time adjustment control 316 that the user can use to move or adjust the time periods presented in the popular program portion 304 and/or another portion (e.g., second portion 206 of FIG. 2 (not shown in FIG. 3)) of the EPG 302, so that the user can view a desired time period(s) and information regarding the programs associated with the desired time period(s).

In some implementations, the respective slots associated with the respective programs in the EPG 302 can provide other information to the user. For example, the slots can comprise respective information regions, such as information region 318 (e.g., information area, information icon) that can comprise certain program-related information regarding the program associated with the slot. For example, the information region 318 can provide program-related information that can indicate whether the associated program is in HD, whether the program is in 3-D, a type and/or sub-type of program, a content rating of a program (e.g., G, PG, PG-13, R, . . . ), and/or other information, such as more fully described herein.

The EPG 302 is generally depicted in 30 minute increments. However, certain programs may not begin on the top of the hour (e.g., 2:00 p.m.) or on the half-hour (e.g., 2:30 p.m.). The content manager component 112 can generate an EPG, such as the EPG 302, to present information regarding respective programs with respect to the respective starting times and ending times, or expected starting times and ending times. For example, as depicted in the EPG 302, the program 320 (e.g., program on channel 500) can start at 1:30 p.m. and end at 2:00 p.m., and the program 322 (e.g., program on channel 360) can start at 1:45 p.m. and end at 2:30 p.m. The content manager component 112 can generate the EPG 302 to present the respective information regarding the respective programs 320 and 322, in accordance with their respective start times and end times.

The content manager component 112 also can execute the EPG 302 to present (e.g., automatically present) the respective most popular programs of the respective time periods, the respective second most popular programs of the respective time periods, and/or a desired mix of popular programs of the respective time periods, based at least in part on selection information received from the user via one or more interface screens and/or a user preference(s) of the user retrieved from the user profile of the user, such as more fully described herein.

Figure 4:
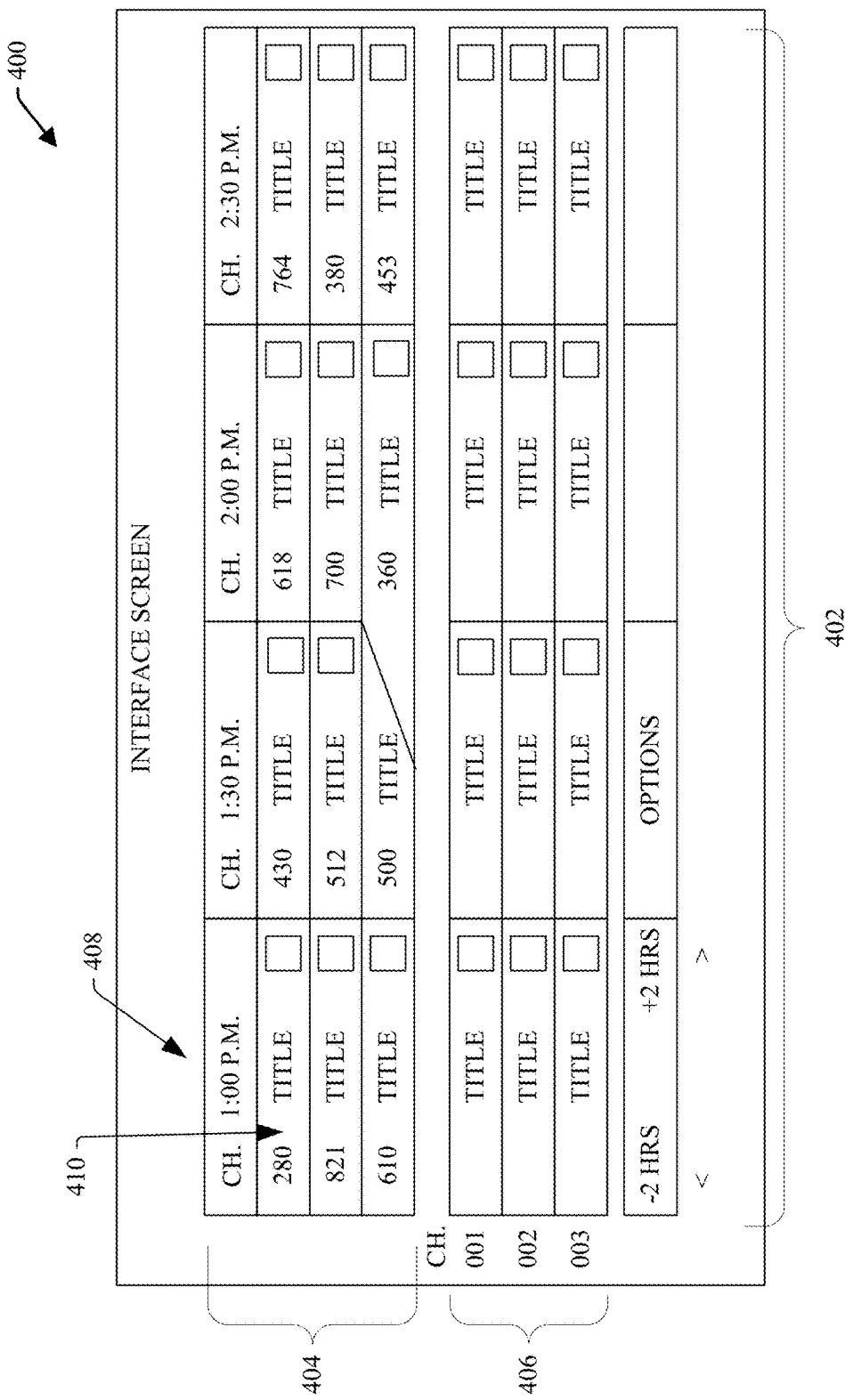
FIG. 4 illustrates a diagram of an example interface screen that can facilitate modification of an EPG to comprise a section having a mix of favorite programs and popular programs for respective time periods, in accordance with various aspects and embodiments of the disclosed subject matter.

Referring briefly to FIG. 4 (along with FIGS. 1, 2, and 3), FIG. 4 illustrates a diagram of an example interface screen 400 that can facilitate modification of an EPG to comprise a section having a mix of favorite programs and popular programs for respective time periods, in accordance with various aspects and embodiments of the disclosed subject matter. The content manager component 112 can facilitate generating the interface screen 400 and presentation of the interface screen 400 via a display screen of the device 102, a display screen of the presentation component 106, or a display screen of the communication device 108.

The interface screen 400 can comprise or present an EPG 402 that can be generated by the content manager component 112 and can comprise a mix of favorite programs of the user and popular programs, such as programs that have been determined to be popular among a group of users, which may or may not include the user utilizing the EPG 402. The interface screen 400, as generated by the content manager component 112, can comprise and/or present various information, buttons, controls, and/or menus (e.g., drop-down menus), etc., to facilitate modifying the EPG 402 to present the desired mix of favorite programs and popular programs associated with respective time periods (in addition to or instead of presenting programs in the EPG based on the respective channels and respective time periods of the programs), select the number (e.g., 3, 4, 5, . . . 10, . . . 15, . . . 20, or other desired number) of favorite and/or popular programs to be presented for respective time periods, select types or sub-types of popular programs for inclusion in the EPG 402, etc.

The interface screen 400 can be presented (e.g., as facilitated by the content manager component 112) via a display screen of the device 102, a display screen of the presentation component 106, or a display screen of the communication device 108, as an alternative to, or in addition to, the interface screen 200, for example. The user can use (e.g., manipulate) buttons or controls on a display screen (e.g., touch screen), another interface, a keyboard or keypad, etc., of the device 102, presentation component 106, communication device 108, or remote control component 110 to facilitate modifying the EPG 402 to present the desired mix of favorite programs of the user and/or popular programs associated with respective time periods (in addition to or instead of presenting programs in the EPG based on the respective channels and respective time periods of the programs), select the number of popular programs to be presented for respective time periods, select types or subtypes of popular programs for inclusion in the EPG 402, etc.

As depicted in the interface screen 400, the content manager component 112 can generate the EPG 402 to comprise a first portion 404 that can present information relating to a desired mix of favorite programs of the user and popular programs, and a second portion 406 that can present information relating to programs, which can be arranged in accordance with their respective channels and respective time periods of presentation. In accordance with this illustrative example, the interface screen 400 can substantially comprise the same top three popular programs, which were presented in the example interface screen 300 of FIG. 3, except as can be modified by the user to replace certain popular programs with favorite programs of the user. For instance, the user can desire to replace the most popular program (e.g., program on channel 340) for the 1:00 p.m. time period (408) (e.g., as shown in the interface screen 300) with the most favorite program (e.g., program on channel 280) of the user (410) for that time period (408), and can use one or more controls associated with the interface screen 400 to make the program replacement in the first portion 404 of the EPG 402. In response to such program replacement, the content manager component 112 can modify the EPG 402 to list the most favorite program (e.g., program on channel 280) of the user for the 1:00 p.m. time period (408), instead of the most popular program (e.g., program on channel 340) for that time period (408).

The user can make one or more other program replacements with regard to the programs presented in the first portion 404 of the EPG 402, as desired. The program replacements can comprise replacing a popular program with a favorite program of the user and/or replacing a popular program with another program that is not a favorite program of the user. The user also can rearrange popular programs for a particular time period to reflect the respective favorability of the programs with respect to the user. The content manager component 112 can modify the first portion 404 of the EPG 402 to replace a popular program with a favorite program of the user or another program based at least in part on the input information (e.g., selection information) received from the user via one or more interfaces and/or user preferences in the user profile of the user, in accordance with the defined favorability criteria.

Additionally or alternatively, instead of a popular program for a particular time period being replaced by a favorite program of the user in a particular cell in the first portion 404 of the EPG 402 and removed from the first portion 404, the content manager component 112 can displace the popular program by moving that popular program to a lower-ranked cell (e.g., the next lower-ranked cell) for that particular time period in the first portion 404 of the EPG 402, as opposed to removing the popular program from the first portion 404 of the EPG 402. If there are other lower-ranked popular programs that are less popular than that popular program for that particular time period, the content manager component 112 also can displace those other lower-ranked popular programs from their original cell location to the next lower-ranked cell for that particular time period in the first portion 404 of the EPG 402 or can remove a lower-ranked popular program from the first portion 404 (e.g., when there is a specified number of popular programs listed for a particular time period, and one of the popular programs is displaced by a favorite program of the user, one of the popular programs (e.g., the lowest-ranked popular program) can be removed from the first portion 404 of the EPG 402).

The content manager component 112 also can execute the EPG 402 to present (e.g., automatically present) the respective desired programs of the respective time periods, as listed in the first portion 404 of the EPG 402, the respective second most popular programs of the respective time periods, and/or a desired mix of popular programs of the respective time periods, based at least in part on selection information received from the user via one or more interface screens and/or a user preference(s) of the user retrieved from the user profile of the user, such as more fully described herein.

With further regard to FIG. 2, in some implementations, if the user has left certain time slots (e.g., cells) in the first portion 204 of the EPG 202 empty (e.g., if the user has not selected a favorite program(s) for a certain time slot(s), leaving such certain time slot(s) blank), the user can have the option (e.g., by selecting such option via the options 218) to replace an empty time slot or empty time slots in the first portion 204 of the EPG 202 by inserting a popular program or popular programs into the empty time slot or empty time slots. In response to the user selecting such option, the content manager component 112 can analyze the first portion 204 of the EPG 202, and, based at least in part on the results of such analysis, the content manager component 112 can identify or determine one or more time slots that are empty in the first portion 204 of the EPG 202. In response to identifying one or more empty time slots, the content manager component 112 can modify the first portion 204 of the EPG 202 to replace an empty time slot or empty time slots in the first portion 204 of the EPG 202 by inserting a popular program or popular programs into the empty time slot or empty time slots, in accordance with one or more user preferences of the user and the defined favorability criteria.

For example, if the user has left the highest-ranked time slot (e.g., number one ranked, or top or first, cell) associated with the 1:30 p.m. to 2:00 p.m. time period empty in the first portion 204 of the EPG 202, the content manager component 112 can modify the first portion 204 of the EPG 202 to replace the empty time slot for the 1:30 p.m. to 2:00 p.m. time period in the first portion 204 of the EPG 202 by inserting a popular program (e.g., the most popular program (e.g., program on channel 430) overall for that time period; or the most popular program of a particular type (e.g., genre) for that time period; or the most popular program for that time period that has a presentation length (e.g., 30 minutes) that fits within that time period) into that empty time slot in the first portion 204 of the EPG 202, in accordance with (e.g., as specified by) one or more user preferences of the user and the defined favorability criteria. As another example, if the user has left a lower-ranked time slot (e.g., number two ranked or second cell) associated with that time period empty in the first portion 204 of the EPG 202, the content manager component 112 can modify the first portion 204 of the EPG 202 to replace the empty time slot for that time period in the first portion 204 of the EPG 202 by inserting the highest-ranked popular program (e.g., overall (e.g., the program on channel 430) or for a particular genre), or alternatively, a lower-ranked (e.g., second-ranked) popular program (e.g., overall (e.g., the program on channel 512) or for a particular genre), for that time period into that empty time slot in the first portion 204 of the EPG 202, in accordance with (e.g., as specified by) the user preference(s) of the user.

With further regard to FIG. 1, as desired, the user can select different EPG modes, which can facilitate presenting different EPGs or different portions of an EPG to the user. For example, if the user selects a favorite programs mode, the content manager component 112 can generate and facilitate presentation of an EPG, or portion thereof, that presents information regarding the respective favorite programs of the user with regard to respective time periods. As another example, if the user selects a popular programs mode, the content manager component 112 can generate and facilitate presentation of an EPG, or portion thereof, that presents information regarding the respective popular programs with regard to respective time periods.

In certain implementations, the user can expand or reduce (e.g., reduce the size of, minimize, or collapse) respective portions (e.g., favorite programs portion, popular programs portion, program listings by channel portion, . . . ) of an EPG, as desired. For instance, if the user desires to minimize the popular programs portion of the EPG and expand the favorite programs portion of the EPG, the user can input information corresponding to such selections, requests, or desires of the user via an interface. In response to such selections, requests, or desires of the user, the content manager component 112 can modify the EPG to minimize the popular programs portion of the EPG and expand the favorite programs portion of the EPG.

In some implementations, the content manager component 112 can manage or modify an EPG associated with a user to present (e.g., display, list) information (e.g., program-related information) relating to sponsored content (e.g., sponsored programs) in a portion of the EPG. For example, the content manager component 112 can manage or modify an EPG associated with a user to present information regarding a desired number of sponsored programs in respective slots of the grid of the EPG for respective time periods. The content manager component 112 can generate the EPG (e.g., customized EPG) to present the information relating to the sponsored content in a same portion of the EPG as the favorite programs and/or popular programs, a portion (e.g., second portion) of the EPG comprising program information arranged in accordance with respective channels and respective time periods of presentation of respective programs, or in a separate portion of the EPG. The ranking of the respective sponsored programs in the EPG grid (e.g., in a portion of the grid of the EPG) can be based at least in part on the compensation a sponsor has paid to the service provider (e.g., cable company, satellite service company) associated with the device 102 and/or EPG, wherein the more compensation the sponsor pays to the service provider, or the higher volume of compensating the service provider to sponsor programs by the sponsor, with regard to sponsored programs, the higher the sponsored programs of the sponsor can be ranked in the portion (e.g., sponsored program section) of the EPG relative to other sponsored programs of other sponsors. Modifying or customizing the EPG to include information relating to sponsored content (e.g., sponsored program listings) from sponsors can enhance (e.g., improve, increase) revenues for the service provider associated with the device 102 and/or EPG.

Certain content (e.g., programs, videos, music, . . . ) can be provided by websites, applications, or services (e.g., Netflix, YouTube, Hulu, Pandora, . . . ) where there is no scheduled time for presentation of such content. That is, the content can be accessed, streamed, and viewed by a user at virtually any time desired by the user. In some implementations, the content manager component 112 can allow a user to dedicate a portion of an EPG associated with the user to listing information relating to such content in the EPG without regard to time periods for selection of such content by the user, as desired.

Additionally or alternatively, the content manager component 112 can allow the user to select an item of such content for inclusion in a favorite programs portion (e.g., favorite programs section) of the EPG, a popular programs portion (e.g., popular programs section) of the EPG, or another program portion of the EPG, at a desired time period. For example, even though a content from a particular content provider can be accessed and viewed at any time desired by the user, the user can select the content to be included in a particular time slot and ranking (e.g., most favorite program ranking) of a portion (e.g., favorites, popular, or other portion) of the EPG. The content manager component 112 can modify the EPG to list such content in that particular time slot based at least in part on this selection of content by the user. If the user has selected the option to have the EPG executed to automatically present certain programs (e.g., certain favorite, popular, or other desired programs) in the EPG, and such content in that particular time slot is one of those certain programs, the content manager component 112 can access such content at that particular time to facilitate presentation of such content via the presentation component 106 or communication device 108 during that particular time period.

As another example, the user can select a first desired or popular (e.g., most popular) movie or other content to be presented at a first desired time, and a second desired or popular (e.g., second most popular) movie or other content (e.g., music concert program), wherein the first movie or content and second movie or content can be streamed from one or more respective websites, applications, or content provider services at any desired time. The content manager component 112 can modify the EPG to list the first movie or content in a first time slot associated with the first desired time, and the second movie or content at the second time slot associated with the second desired time (e.g., immediately after or subsequent to the first desired time), based at least in part on the content selections of the user. As desired by the user, the content manager component 112 can facilitate accessing and presenting (e.g., via the presentation component 106 or communication device 108) the first movie or content during the first time slot, and accessing and presenting (e.g., automatically presenting) the second movie or content during the second time slot, in accordance with the information in the EPG.

In some implementations, the content manager component 112 can present, in a portion (e.g., in a subset of cells or slots of the grid) of the EPG, recommendations or suggestions to view certain programs, wherein the content manager component 112 or another component has determined such program recommendations or suggestions based at least in part on the program viewing history of the user, user preferences of the user, and/or other information (e.g., demographic information associated with the user and/or other people), in accordance with the defined favorability criteria. For example, the content manager component 112 can generate a recommendation portion of the EPG that can present one or more programs for a particular time period(s) that may be of interest to the user, as determined by the content manager component 112.

The content manager component 112 also can identify and facilitate resolving conflicts in presenting programming that may arise, in accordance with the defined favorability criteria. As an example, a user can select one program to be a most favorite program of the user for a particular time period, wherein the content manager component 112 can modify or update an EPG to reflect that selection of most favorite program for that particular time period. Subsequently, the user may select another program for that particular time period to be a most favorite program of the user or a desired program for presentation. This may occur, for instance, if the user subsequently desires to select a sports program (e.g., football game) or movie for viewing, wherein at least a portion of that sports program or movie will or is expected to be presented during the particular time period that the most favorite program previously selected by the user is to be presented.

The content manager component 112 can monitor the selection of programming by the user, and the scheduled programming of events (e.g., in the EPG), and can detect the conflict in the program selections of the user. In response to detecting the conflict in the program selections, the content manager component 112 can generate a message (e.g., notification or message of programming conflict), and can present (e.g., communicate) the message to the user via the device 102, the presentation component 106, or communication device 108 to notify the user of the programming conflict. The user can use an interface of the device 102, presentation component 106, communication device 108, or remote control component 110 to generate a response message and send it back to the content manager component 112, wherein the response message can indicate whether the user desires to view the originally selected favorite program for that time period, or desires to override that original favorite selection and view the subsequently selected program during that time period. In response to the response message, the content manager component 112 can take the appropriate action to maintain the presentation of the originally selected favorite program or present the subsequently selected program during that time period, in accordance with the information (e.g., user preference or selection) in the response message.

The disclosed subject matter, by employing the content manager component 112 to generate, manage, and modify an EPG(s) associated with a user(s) to facilitate customized presentation of information (e.g., favorite programs of user, popular programs among users) in the EPG(s) and/or automatic presentation of programs listed in the EPG(s), in accordance with the defined favorability criteria, can provide a number of benefits that can enhance the presentation of content (e.g., programs) to users over conventional techniques. For example, the disclosed subject matter, by employing the content manager component 112 to generate, manage, and modify an EPG(s) associated with a user(s), can enable desirable presentation of program listings of favorite programs of a user and/or popular programs among users, to the user without the user having to take the time to search through all or a large portion of the channel listings in the EPG. As another example, the disclosed subject matter, by employing the content manager component 112, can enable desirable execution of an EPG associated with the user to automatically present certain desired programs (e.g., favorite programs, popular programs, and/or selected programs) listed in the EPG during respective time periods, including automatically switching between different channels with regard to those desired programs, without the user having to interact with the device or associated component (e.g., remote control component, communication device, . . . ) to switch channels or select programs.

Figure 5:
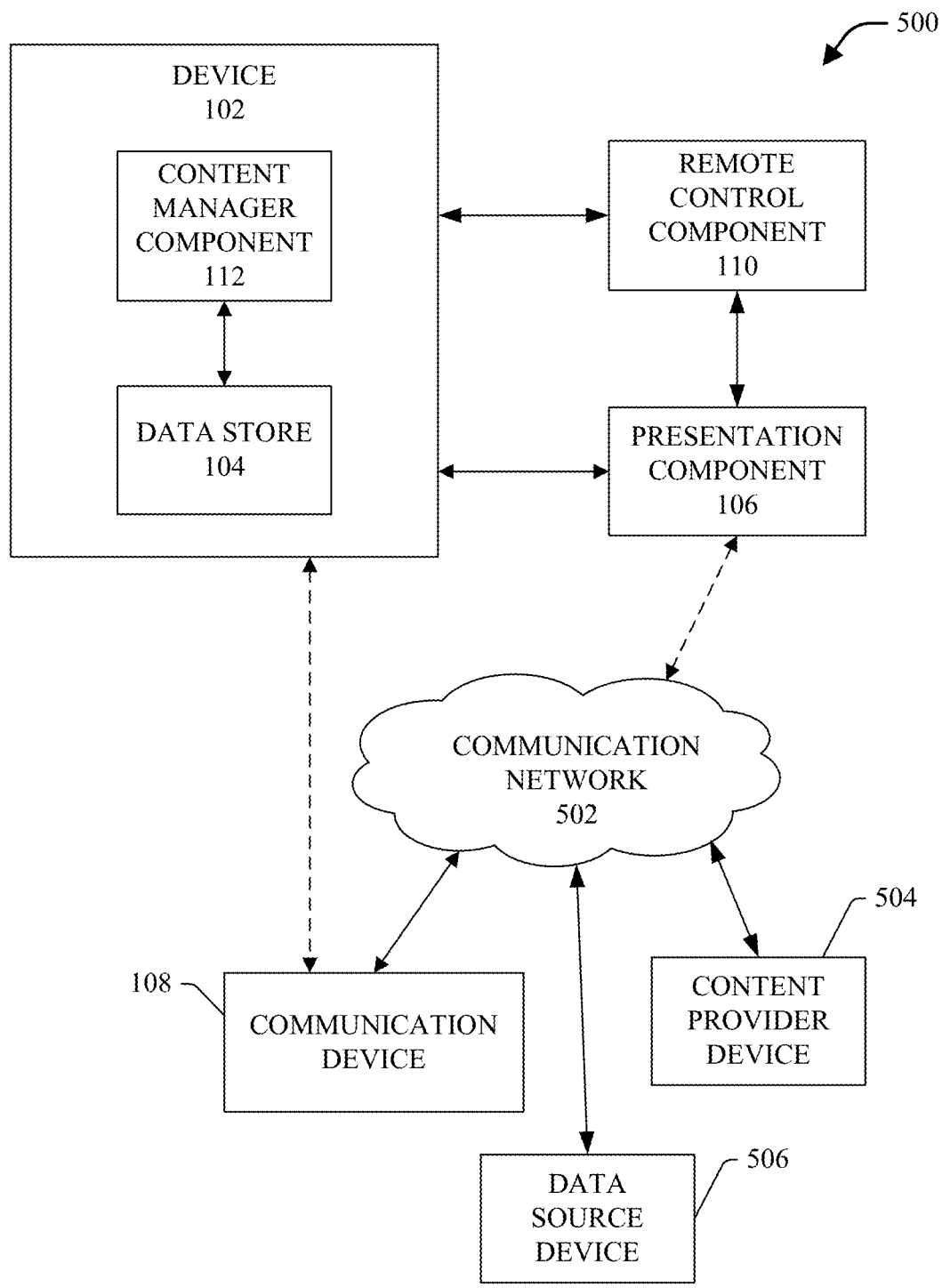
FIG. 5 presents a block diagram of another example system that can control presentation of content (e.g., programs) and presentation of program information in an EPG, in accordance with various aspects and embodiments of the disclosed subject matter.

Referring to FIG. 5, FIG. 5 presents a block diagram of another example system 500 that can control presentation of content (e.g., programs) and presentation of program information in an EPG, in accordance with various aspects and embodiments of the disclosed subject matter. The system 500 can comprise a device 102 (e.g., STB, STU, or other communication device) that can receive content (e.g., video or audio content) from one or more content channels or sources, such as, for example, a content provider device associated with the device 102 (e.g., via a communication network).

The device 102 can be employed to record or store the content in a data store 104 of (or associated with) the device 102. The content can be stored in the data store 104, for example, for future presentation by the device 102 and a presentation component 106 (e.g., television, IPTV, or other display device) or other communication device 108 (e.g., mobile phone, computer, electronic pad or tablet, electronic eyewear, . . . ) associated with the device 102. The device 102 also can stream the content for presentation via the presentation component 106 or other communication device 108 associated with the device 102. The device 102 can comprise or be associated with the content manager component 112 which can generate or modify EPGs, facilitate presentation of respective items of content (e.g., programs) at respective time periods in accordance with an EPG, and/or perform other functions or operations, such as more fully described herein.

The presentation component 106 and/or the communication device 108 can be associated with (e.g., communicatively connected to) the device 102 via a wired or wireless communication connection. In some implementations, the presentation component 106 and/or communication device 108 can be associated with the device 102 via a communication network 502.

The communication network 502 can comprise a macro communication network and/or a micro communication network. The macro communication network can be, can comprise, or can be associated with a core network, a cellular network, an IP-based network, Wi-Fi, gigabit wireless (Gi-Fi) network, Hi-Fi network (e.g., providing higher gigabit data communication than Gi-Fi or Wi-Fi), Bluetooth, ZigBee, etc. The micro communication network can be associated with the macro communication network, wherein the micro communication network typically can operate in a defined local area (e.g., in or in proximity to a home, building, or other defined area). The micro communication network can be, can comprise, or can be associated with Wi-Fi, Gi-Fi, Hi-Fi, Bluetooth, ZigBee, etc., and/or can be associated with (e.g., connected to) the macro communication network. The micro communication network can be or can comprise, for example a local area network (LAN), that can facilitate connecting certain devices (e.g., communication devices) associated with the micro communication network to each other and/or to the macro communication network.

Respective communication devices (e.g., device 102, presentation component 106, communication device 108, content provider device 504, . . . ) can be associated with (e.g., communicatively connected to) the communication network 502 via a wireless communication connection or a wireline (e.g., wired) communication connection. The respective communication devices (e.g., 102, 106, 108, 504, . . . ) can operate and communicate in a communication network environment. At various times, a communication device (e.g., 102, 106, 108, and/or 504, . . . ) can be communicatively connected via a wireless communication connection(s) to one or more radio access networks (RANs) (not shown), which can comprise one or more base stations (not shown) to communicatively connect the communication device to the communication network 502 to enable the communication device to communicate other communication devices associated with (e.g., communicatively connected to) the communication network 502 in the communication network environment. The RANs can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 502 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; Gi-Fi; Hi-Fi; etc. The communication network 502 (e.g., a core network, cellular network, or a network comprising a core network, cellular network, and/or an IP-based network) can facilitate routing voice and data communications between a communication device(s) (e.g., 106, 108, and/or 504, . . . ) and another communication device (e.g., the device 102) and/or other communication devices associated with the communication network 502 in the communication network environment. The communication network 502 also can allocate resources to the communication devices in the communication network 502, convert or enforce protocols, establish and enforce quality of service (QOS) for the communication devices, provide applications or services in the communication network 502, translate signals, and/or perform other desired functions to facilitate system interoperability and communication in the communication network 502 (e.g., wireless portion of the communication network 502 or wireline portion of the communication network 502). The communication network 502 further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices in the communication network environment.

As a communication device(s) (e.g., communication device 108) is moved through a wireless communication network environment, at various times, the communication device(s) can be connected (e.g., wirelessly connected) to one of a plurality of access points (APs) (e.g., macro or cellular AP, femto AP, pico AP, wi-fi AP, wi-max AP, hotspot (e.g., hotspot 1.x, hotspot 2.x, where x is an integer number; communication device (e.g., communication device functioning as a mobile hotspot)) that can operate in the wireless communication network environment. An AP (e.g., base station) can serve a specified coverage area to facilitate communication by the communication device(s) (e.g., 108) or other communication devices in the wireless communication network environment. An AP can serve a respective coverage cell (e.g., macrocell, femtocell, picocell, etc.) that can cover a respective specified area, and the AP can service mobile wireless devices, such as the communication device(s) (e.g., 108) located in the respective area covered by the cell, where such coverage can be achieved via a wireless link (e.g., uplink (UL), downlink (DL)). When an attachment attempt is successful, the communication device(s) (e.g., 108) can be served by the AP and incoming voice and data traffic can be paged and routed to the communication device(s) (e.g., 108) through the AP, and outgoing voice and data traffic from the communication device(s) (e.g., 108) can be paged and routed through the AP to other communication devices in the communication network environment. In an aspect, the communication device(s) (e.g., 108) can be connected and can communicate wirelessly using virtually any desired wireless technology, including, for example, cellular, Wi-Fi, Gi-Fi, Hi-Fi, Wi-Max, Bluetooth, wireless local area networks (WLAN), etc.

One or more content provider devices, such as content provider device 504 can be associated with (e.g., communicatively connected to) the communication network 502. As desired, the content provider devices, such as content provider device 504, can be connected to the device 102, presentation component 106, or communication device 108 via the communication network 502. The respective content provider devices can be associated with respective content providers. The content provider devices, such as content provider device 504, can provide (e.g., communicate) content and/or other information (e.g., program-related information or other metadata) to the device 102 (or the presentation component 106 or the communication device 108) via the communication network 502. It is to be appreciated and understood that the device 102 (or the presentation component 106 or the communication device 108) also can receive content from another content provider device(s) via a direct wireline or wireless communication connection (e.g., communication channel) or other means without having to communicate the content via the communication network 502.

The content provider devices (e.g., 504) can be associated with, for example, a television-type device or system (e.g., terrestrial television channels, cable television system, satellite television system), one or more media (e.g., video, audio) streaming applications (e.g., YouTube, Hulu, Netflix, Pandora, . . . ) or websites, one or more video-on-demand services, one or more pay-per-view services, a radio (e.g., terrestrial radio, satellite radio), or other media devices or applications (e.g., a computer, a smart phone, an electronic pad or tablet, an electronic gaming device, a compact disc (CD) player, a digital video disc (DVD) player, . . . ).

The system 500 also can comprise one or more data source devices, such as data source device 506, associated with one or more data sources. The one or more data sources can provide various types of information to the content manager component 112 of the device 102, wherein the information can comprise favorability-related or popularity-related information regarding programs. For example, the one or more data sources can provide, via the one or more data source devices (e.g., 506), information relating to respective ratings of respective programs as determined by one or more content rating sources, wherein the respective ratings of the respective programs can be determined based at least in part on the Nielsen ratings, data obtained from STBs of users, data obtained from social media sources (e.g., Facebook, Twitter, YouTube, . . . ), data obtained from other sources (e.g., TiVo, TRA, Rentrak Corp., . . . )), etc.

In some implementations, to facilitate generating and modifying (e.g., customizing) an EPG(s) associated with a user(s), a user can use an interface on the device 102 and/or an interface on the presentation component 106 and/or remote control component 110 to access and use an application (e.g., EPG application) that can facilitate managing the generation and modification of an EPG associated with a user, in accordance with the defined favorability criteria.

Additionally or alternatively, the user can use the communication device 108 to access and/or download an application(s) (e.g., EPG application on the device 102 (or in the cloud) and/or EPG application for mobile devices), wherein the application(s) can be used to facilitate managing the generation and modification of an EPG associated with a user. If and when an application is downloaded to the communication device 108, the application can generate an interface, comprising one or more interface screens, controls, buttons, etc., that can be presented on the communication device 108 and employed to facilitate managing the generation and modification of an EPG associated with a user. In some implementations, the user can use a web browser on the communication device to access a website associated with the service providing the EPG, and can access an application via the web browser, wherein such application can generate an interface, comprising one or more interface screens, controls, buttons, etc., that can be presented, via the web browser, on the communication device 108 and employed to facilitate managing the generation and modification of an EPG associated with a user.

In accordance with various implementations, all or a portion of the operations and functions of the content manager component 112 can be performed in a cloud environment. For instance, while the content manager component 112 and data store 104 are illustrated as being within the device 102, in accordance with various embodiments, all or a portion of the content manager component 112, and all or a portion of the data store 104, can reside in the cloud environment, wherein the content manager component 112 in the cloud can communicate with the device 102, presentation component 106, and/or communication device 108 via the communication network 502 to facilitate managing generation and modification of an EPG associated with a user. In such instance, the device 102 can comprise an application and/or a local content manager component that can coordinate with the content manager component in the cloud to facilitate performing the operations and functions relating to managing generation and modification of an EPG associated with a user. For example, the content manager component in the cloud can generate and modify an EPG associated with the user and store that EPG in the data store in the cloud. When the user uses the device 102 to access the EPG of the user, the device 102, e.g., via the application or local content manager component of the device 102, can communicate with the content manager component in the cloud, via the communication network 502, to obtain the EPG (e.g., EPG data) associated with the user, wherein the device 102 can present the EPG associated with the user to the user via the presentation component 106 or communication device 108.

Figure 6:
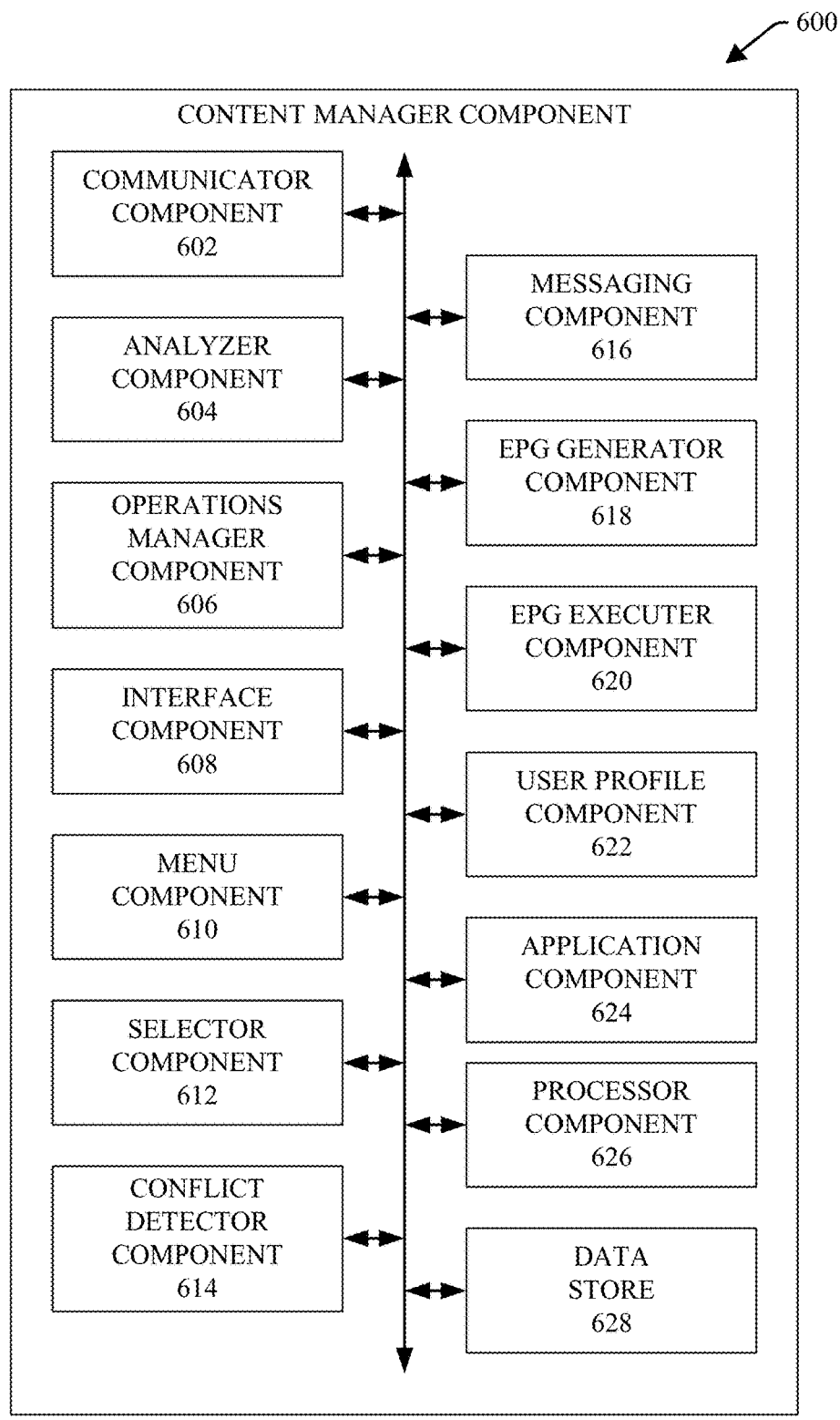
FIG. 6 depicts a block diagram of an example content manager component, in accordance with various aspects and embodiments of the disclosed subject matter.

FIG. 6 depicts a block diagram of an example content manager component 600, in accordance with various aspects and embodiments of the disclosed subject matter. In some implementations, the content manager component 600 can be part of or associated with a device, such as a media device (e.g., an STB or STU).

The content manager component 600 can comprise, for example, a communicator component 602, an analyzer component 604, an operations manager component 606, an interface component 608, a menu component 610, a selector component 612, a conflict detector component 614, a messaging component 616, an EPG generator component 618, an EPG executer component 620, a user profile component 622, and an application component 624.

The communicator component 602 can transmit information from the content manager component 600 or associated media device to another component(s) or device(s) (e.g., presentation component, communication device) and/or can receive information from the other component(s) or device(s). For instance, the communicator component 602 can receive content from a content provider device, and transmit content to a presentation component or other communication device associated with the device. The communicator component 602 also can receive EPG-related or program-related information (e.g., selection of favorite programs, parameters for modifying or customizing an EPG with regard to favorite or popular programs) from a user via one or more interfaces of the device, presentation component, communication device, remote control component, and/or application.

The analyzer component 604 can analyze information and can generate analysis results based at least in part on the results of the analysis. For example, the analyzer component 604 can analyze EPG-related or program-related information received from the user to facilitate determining modifications to be made to an EPG associated with the user based at least in part on the results of the analysis. As another example, the analyzer component 604 can analyze information relating to relative popularity of respective programs obtained from one or more sources to facilitate determining respective popularity rankings of respective programs based at least in part on the analysis results.

The operations manager component 606 can control (e.g., manage) operations associated with the content manager component 600. For example, the operations manager component 606 can facilitate generating instructions to have components of the content manager component 600 perform operations, and can communicate respective instructions to respective components (e.g., communicator component 602, analyzer component 604, interface component 608, . . . ) of the content manager component 600 to facilitate performance of operations by the respective components of the content manager component 600 based at least in part on the instructions, in accordance with the defined favorability criteria and defined favorability algorithms relating to generating and modifying (e.g., customizing) EPGs associated with users. The operations manager component 606 also can facilitate controlling data flow between the respective components of the content manager component 600 and controlling data flow between the content manager component 600 and another component(s) or device(s) (e.g., communication device, presentation component, content provider device, remote control component, device of the communication network) associated with (e.g., connected to) the content manager component 600.

The interface component 608 can generate and facilitate presenting, for example, via the device, a presentation component, a communication device, or a remote control component, various interface screens, buttons, controls, menus, data fields, etc., that can be employed to facilitate generating, modifying, and presenting EPGs associated with users. The interface component 608 can facilitate enabling a user to access one or more menus and manipulate controls or buttons to enable a user to make program selections (e.g., to select favorite programs), issue requests or commands, and/or make parameter selections (e.g., set or select a number of favorite programs or popular programs to be presented in an EPG, set or select execution of an EPG to automatically present desired (e.g., favorite or popular) programs), to facilitate controlling or customizing (e.g., tailoring) an EPG(s) associated with a user, as desired by the user.

The interface component 608 and menu component 610 can coordinate and/or operate in conjunction with each other to facilitate the generation and presentation of one or more menus via one or more interfaces (e.g., interface screens) to enable a user to access menus, select menu items, select programs in a menu, select requests or commands in a menu, select parameters in a menu, etc. The menu component 610 can facilitate generating and presenting, via an interface(s), one or more menus in a toolbar, one or more pop-up menus, and/or one or more drop-down menus.

The selector component 612 can facilitate selection of programs or EPG-related or program-related information, for example, in response to input information (e.g., selection information) received from a user via an interface. For instance, the selector component 612 can facilitate enabling a user to select or highlight a program for inclusion in a favorites section of an EPG associated with the user, select a program (e.g., select information relating to the program) and move (e.g., via a drag-and-drop operation) the program from a main section of an EPG to the favorites section of the EPG, select an item (e.g., program, parameter value, . . . ) in a menu, and/or perform other selection operations.

The conflict detector component 614 can monitor and analyze information (e.g., program-related information, such as respective presentation times of respective programs) associated with an EPG, information (e.g., selection information to select a program(s)) received from a user, and/or other information relating to programs. Based at least in part on the results of monitoring and analyzing such information, the conflict detector component 614 can detect when a conflict occurs between the scheduling or presentation of programs associated with an EPG associated with the user. For example, the EPG associated with the user can have a favorite program (e.g., most favorite program) selected for a particular time period. If the user attempts to select another program as a favorite program for all or part of that particular time period in the EPG, the conflict detector component 614 can detect the scheduling conflict between the two programs. The messaging component 616 can generate a message (e.g., a conflict notification) that can notify the user of the conflict, wherein the communicator component 602, interface component 608, and/or another component of the content manager component 600 can facilitate communicating and/or presenting the message to the user (e.g., via an interface). The message may also include information to request that the user decide whether the user wants to maintain the previous favorite selection or override that favorite selection to make the other program the favorite selection for that particular time period. The content manager component 600 (e.g., via the EPG generator component 618 and conflict detector component 614) can resolve the scheduling conflict, based at least in part on the response information from the user and/or a user preference of the user.

As another example, the user may have a program selected as a favorite program for a particular time period in the EPG associated with the user. The user can be viewing another program (e.g., sports program, or other program) that does not have a defined end point or has had its presentation time shifted for some reason, wherein the presentation of the other program is going to extend into the particular time period of the favorite program. As a result, there can be a scheduling conflict between the two programs. The conflict detector component 614 can detect the scheduling conflict between the two programs. In response to the conflict, the messaging component 616 can generate a message to notify the user of the scheduling conflict. The communicator component 602 and/or interface component 608 can facilitate communicator or presentation of the message to the user. The message can inquire as to whether the user desires to continue watching the current program or switch to the favorite program during the particular time period. The content manager component 600 (e.g., via the EPG generator component 618 and conflict detector component 614) can resolve such scheduling conflict, based at least in part on the response information (e.g., response message) from the user and/or a user preference of the user.

The EPG generator component 618 can generate or modify an EPG(s) associated with a user based at least in part on selection information (e.g., selection of favorite programs, selection of popular programs, selection of parameters, . . . ) received from the user, in accordance with the defined favorability criteria. The EPG generator component 618 can generate a first portion of the EPG to include respective favorite programs of the user associated with respective time periods, and/or a second portion of the EPG to include respective popular programs associated with respective time periods, and/or a third portion of the EPG to include respective programs arranged based at least in part on the respective channels or sources of the respective programs and the respective time periods associated with the respective programs.

The EPG executer component 620 can execute an EPG associated with a user to present (e.g., automatically present) certain programs listed in the EPG during respective time periods, in accordance with selections (e.g., program selections) of the user and/or a user preference of the user. For example, the user can communicate selection information, e.g., via an interface associated with the interface component 608, to have the most favorite programs of the user associated with respective time periods during a certain time frame (e.g., 8:00 p.m. to 11:00 p.m.) presented to the user via the presentation component. The EPG executer component 620 can execute the EPG to automatically present the respective most favorite programs of the user associated with the respective time periods during that certain time frame, including automatically switching channels from one channel after one favorite program of the user ends to another channel presenting the next favorite program of the user, without the user having to further interact with the device.

The user profile component 622 can facilitate generating one or more user profiles associated with one or more users. The user profile component 622 can facilitate storing information, such as information relating to selecting programs to be listed as favorite programs in an EPG associated with a user, information relating to selecting to have popular programs presented in the EPG, user preferences relating to program listings in the EPG or presentation of programs listed in the EPG, etc., in the user profile of the user. The user preferences can comprise, for example, preferences of the user with regard to resolving scheduling conflicts, preferences regarding a number of favorite programs or popular programs that the user desires to be presented in the EPG for each time period, preferences regarding whether to execute an EPG to present (e.g., automatically present) certain programs (e.g., certain favorite programs, certain popular programs, and/or certain selected programs) listed in the EPG, and/or preferences relating to managing one or more EPGs associated with the user.

The application component 624 can be employed to generate, provide, and/or enable use of one or more applications (e.g., an EPG application, a content provider application, . . . ) that can be used by the device (e.g., STB or STU), presentation component (e.g., TV, IPTV), a communication device (e.g., mobile phone, electronic pad or tablet, computer, . . . ), and/or remote control component to facilitate utilizing components (e.g., components of the content manager component 600) and services associated with generating, managing, and modifying EPGs associated with users. For example, a user can use a communication device to download an application from the application component 624 to the communication device or can otherwise obtain and/or access the application (directly or indirectly) from the application component 624. The application can operate in conjunction with the components of the content manager component 600, the device, or other components or devices to facilitate enabling the user to utilize the components and services associated with generating, managing, and modifying an EPG(s) associated with user(s). The user can use the application associated with the communication device to facilitate selecting favorite programs for inclusion in the EPG, having popular programs included in the EPG, setting parameters associated with the EPG, resolving scheduling conflicts, modifying information in an EPG, executing an EPG, and/or accessing content or controlling presentation of the content listed in an EPG, etc.

The application component 624 also can generate, provide, and/or enable use of a content provider application (e.g., Pandora application, YouTube application, Hulu application, Netflix application, . . . ). A content provider application can be used to facilitate providing content from a content provider (e.g., a server device of the content provider) to the device, presentation component, and/or communication device of the user for presentation of the content via the presentation component or communication device of the user.

The content manager component 600 can comprise a processor component 626 that can work in conjunction with the other components (e.g., communicator component 602, analyzer component 604, operations manager component 606, interface component 608, menu component 610, selector component 612, conflict detector component 614, messaging component 616, EPG generator component 618, EPG executer component 620, user profile component 622, application component 624, data store 628) to facilitate performing the various functions of the content manager component 600. The processor component 626 can employ one or more processors, microprocessors, or controllers that can process data, such as information relating to users, user preferences, EPGs (e.g., generating or modifying EPGs), favorite programs of users, popular programs among a group of users, parameter values, traffic flows, policies, defined favorability criteria, algorithms (e.g., defined favorability algorithm), protocols, interfaces, tools, and/or other information, to facilitate operation of the content manager component 600, as more fully disclosed herein, and control data flow between the content manager component 600 and other components (e.g., communication devices, presentation component, content provider devices, remote control component, devices of the communication network, data sources, applications) associated with the content manager component 600.

The content manager component 600 also can include a data store 628 that can store data structures (e.g., user data, metadata), code structure(s) (e.g., modules, objects, hashes, classes, procedures) or instructions, information relating to users, user preferences, EPGs (e.g., generating or modifying EPGs), favorite programs of users, popular programs among a group of users, parameter values, traffic flows, policies, defined favorability criteria, algorithms (e.g., defined favorability algorithm), protocols, interfaces, tools, and/or other information, to facilitate controlling operations associated with the content manager component 600. In an aspect, the processor component 626 can be functionally coupled (e.g., through a memory bus) to the data store 628 in order to store and retrieve information desired to operate and/or confer functionality, at least in part, to the communicator component 602, analyzer component 604, operations manager component 606, interface component 608, menu component 610, selector component 612, conflict detector component 614, messaging component 616, EPG generator component 618, EPG executer component 620, user profile component 622, application component 624, data store 628, etc., and/or substantially any other operational aspects of the content manager component 600.

It is to be appreciated and understood that authentication protocols and techniques can be employed to facilitate security of data (e.g., content, EPGs, user profiles, . . . ) associated with a device (e.g., STB or STU), a communication device, memory, or other devices, in accordance with the disclosed subject matter. For instance, an authenticator component can employ authentication protocols to facilitate security and integrity of the device (or communication device or application), including operation of the device (or communication device or application) and functions associated with the device (or communication device or application), data associated with the device (or communication device or application), such as, e.g., communicated data, data stored in a data store of or associated with the device (or communication device or application), in accordance with the disclosed subject matter. For example, the authenticator component can solicit authentication data (e.g., an authentication credential) from an entity (e.g., a user, another device), and, upon receiving the authentication data so solicited, can be employed, individually and/or in conjunction with information acquired and ascertained as a result of biometric modalities employed, to facilitate control access to the device (or communication device or application), access and control of certain functions associated with the device (or communication device or application), access to data associated with the device (or communication device or application), etc. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authenticator component. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authenticator component can implement one or more machine-implemented techniques to identify an entity (e.g., user, communication device) by its unique physical and behavioral characteristics and attributes. Biometric modalities that can be employed can include, for example, finger print identification that can scan the corrugated ridges of skin that are non-continuous and form a pattern that can provide distinguishing features to identify an entity, face recognition wherein measurements of key points on an entity's face can provide a unique pattern that can be associated with the entity, and iris recognition that measures from the outer edge towards the pupil the patterns associated with the colored part of the eye—the iris—to detect unique features associated with an entity's iris.

In response to verifying that the received authentication data matches stored authentication data relating to the entity, the authenticator component can grant a subset of access and control rights to allow the entity (e.g., user and/or an associated communication device) access to the device (or communication device or application), access and control of certain functions associated with the device (or communication device or application), and/or access to data associated with the device (or communication device or application), etc., in accordance with access and control rights that the entity is permitted to have. In response to not being able to verify that the received authentication data matches stored authentication data relating to the entity, the authenticator component can deny the entity access and control rights to access to the device (or communication device or application), access and control of certain functions associated with the device (or communication device or application), and/or access to data associated with the device (or communication device or application), etc., or can grant limited access and control rights to the entity, wherein the limited access rights can be access and control rights that are permitted to be granted to non- or un-authorized entities. The authenticator component also can provide an entity with one or more additional opportunities to provide valid authentication data up to a defined maximum number of authentication attempts.

It is also to be understood and appreciated that cryptographic protocols can be employed to facilitate security of data associated with a memory (e.g., data store) in accordance with the disclosed subject matter. For example, a cryptographic component (e.g., cryptographic engine) can be employed and can facilitate encrypting and/or decrypting data (e.g., content, content schedule, user-related information) to facilitate securing data being written to, stored in, and/or read from memory (e.g., data store). The cryptographic component can provide symmetric cryptographic tools and accelerators (e.g., Twofish, Blowfish, AES, TDES, IDEA, CAST5, RC4, etc.) to ensure that the memory, or at least a specified partition in the memory component, or portions thereof, can only be accessed by those entities authorized and/or authenticated to do so. The cryptographic component can also provide asymmetric cryptographic accelerators and tools (e.g., RSA, Digital Signature Standard (DSS), and the like) to ensure that a specified partition in a memory, or portions thereof, only can be accessed by those entities that are authorized and certified to do so. Additionally, the cryptographic component can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in the memory is confined to those entities authorized to gain access.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
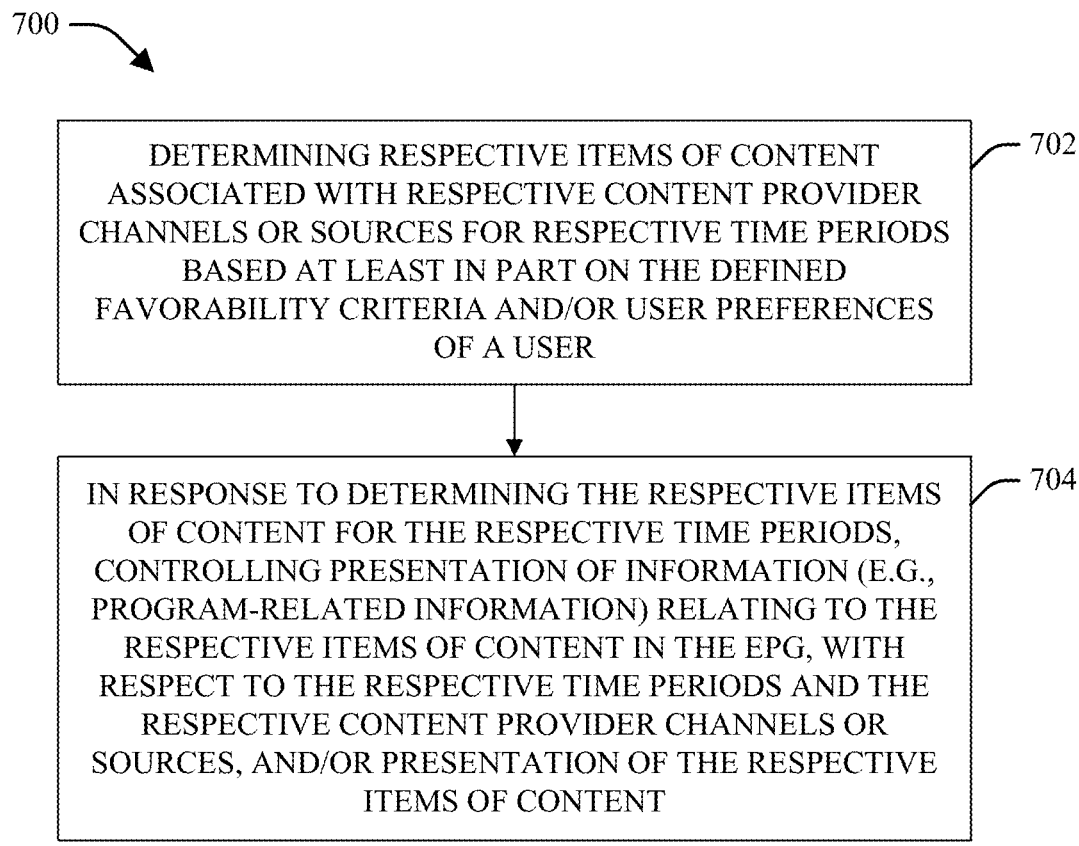
FIG. 7 illustrates a flow diagram of an example method that can control presentation of information relating to items of content in an EPG and/or presentation of items of content associated with the EPG to a user, in accordance with various aspects and embodiments of the disclosed subject matter.
Figure 8:
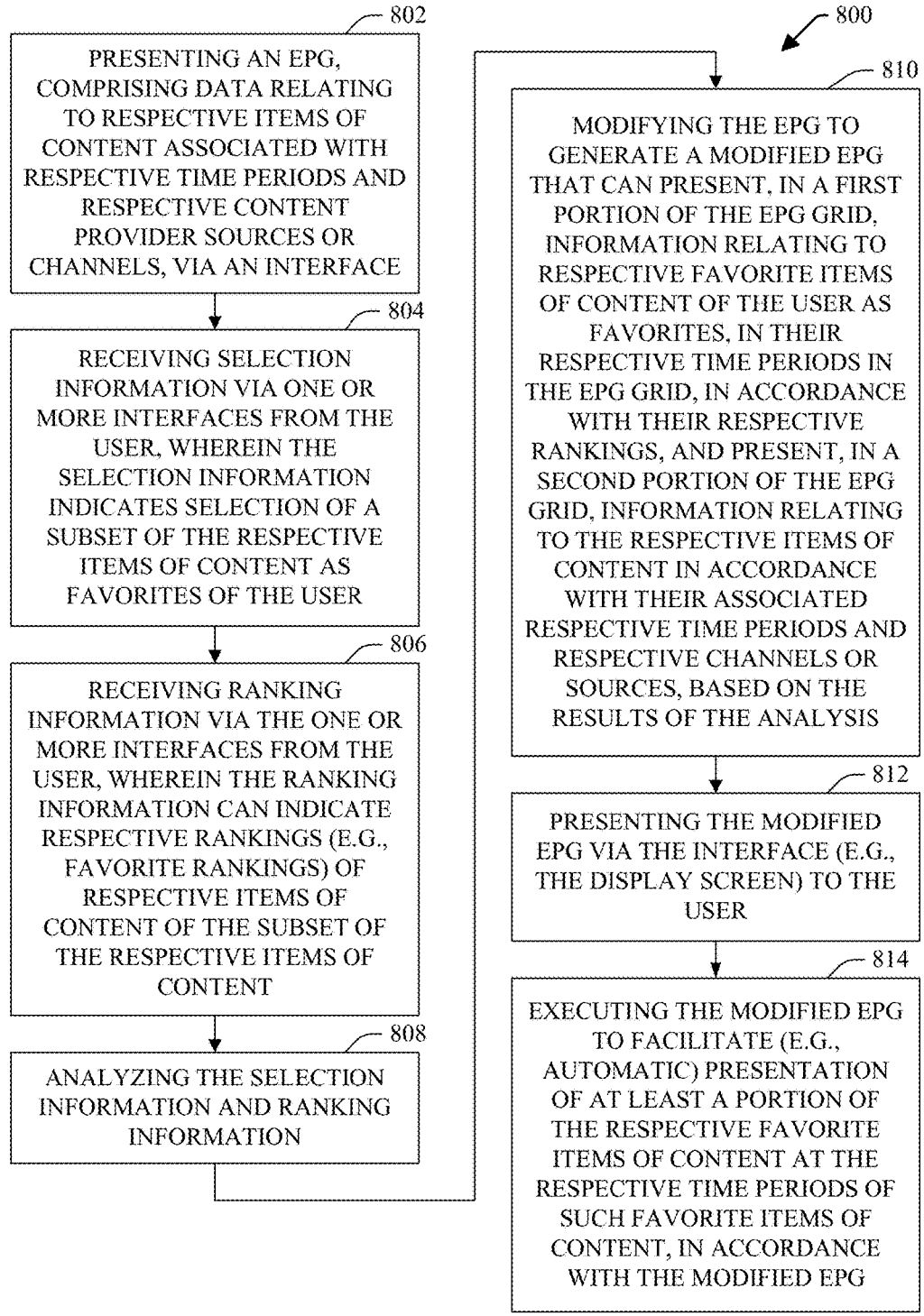
FIG. 8 presents a flow chart of another example method that can control presentation of information relating to items of content in an EPG and/or presentation of items of content to a user based at least in part on favorite items of content of a user, in accordance with various aspects and embodiments of the disclosed subject matter.
Figure 9:
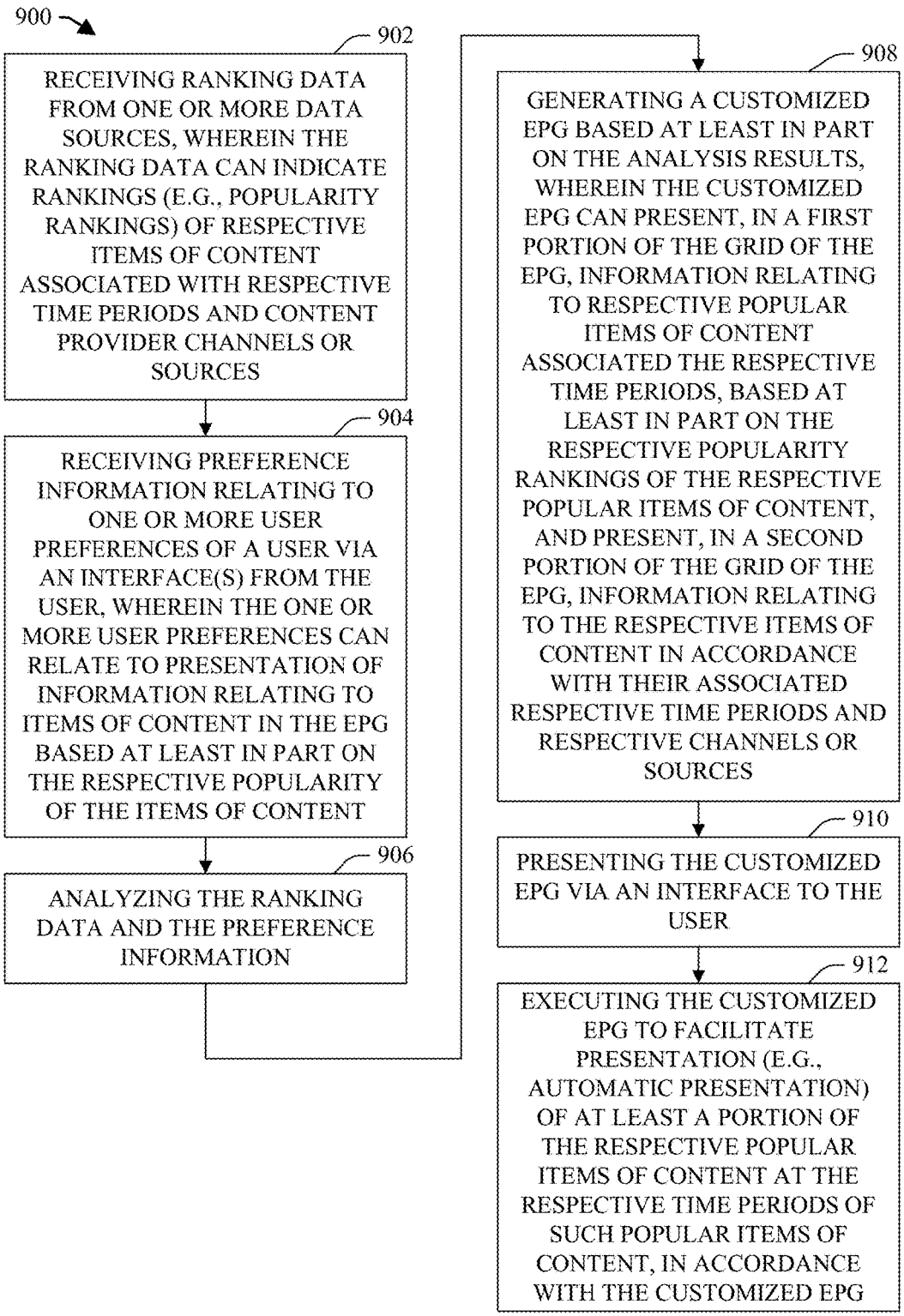
FIG. 9 depicts a flow chart of an example method that can control presentation of information relating to items of content in an EPG and/or presentation of items of content to a user based at least in part on the relative popularity of the items of content, in accordance with various aspects and embodiments of the disclosed subject matter.

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 that can control presentation of information relating to items of content (e.g., programs) in an EPG and/or presentation of items of content associated with the EPG to a user, in accordance with various aspects and embodiments of the disclosed subject matter. The method 700 can be employed by, for example, a content manager component of or associated with the device.

At 702, respective items of content associated with respective content provider channels or sources for respective time periods can be determined based at least in part on the defined favorability criteria and/or user preferences of a user. The content manager component can determine the respective items of content (e.g., TV or other programs) associated with the respective content provider channels or sources for the respective time periods based at least in part on the defined favorability criteria and/or user preferences of a user. The defined favorability criteria can relate to the favorability, as determined by the user, of presenting a particular item of content, which can be presented via a particular content provider channel or source, at a particular time period, over, or as opposed to, presenting another item of content, which is presented via another content provider channel or source, at that particular time period. For instance, via an interface of the device, presentation component, communication device, remote control component, and/or application, the user can select (e.g., by entering or inputting selection information), as favorite content items (e.g., TV or other programs) of the user, certain items of content associated with (e.g., presented by) certain content provider channels or sources at certain time periods. The user can, for example, rank the certain items of content associated with the respective time periods from most favorite to second most favorite to third most favorite, and so on, as desired by the user.

Additionally or alternatively, the defined favorability criteria can relate to the favorability or popularity, as determined by or from a plurality of users, of presenting a particular item of content, which can be presented via a particular content provider channel or source, at a particular time period, over, or as opposed to, presenting another item of content, which is presented via another content provider channel or source, at that particular time period. With regard to a group of users (e.g., associated with a defined geographical region(s) and/or demographic(s)), the respective favorability or popularity of respective items of content can be determined or identified, for example, based at least in part on respective ratings of the respective items of content that can be determined from respective content ratings sources (e.g., Nielsen ratings, content ratings based on data obtained from STBs, content ratings obtained from social media sources, ratings or supplementary data relating to content popularity obtained from other sources (e.g., TiVo, TRA, Rentrak Corp., . . . ), . . . ).

At 704, in response to determining the respective items of content for the respective time periods, presentation of information (e.g., program-related information) the respective items of content in the EPG, with respect to the respective time periods and the respective content provider channels or sources, and/or presentation of the respective items of content can be controlled. The content manager component control can control presentation of the information relating to the respective items of content, with respect to the respective time periods and the respective content provider channels or sources, in the EPG and/or presentation of the respective items of content based at least in part on (e.g., in response to) determining the respective items of content from the respective channels or sources for the respective time periods.

For instance, the content manager component can control the presentation of the respective items of content (e.g., control presentation of program-related information relating to the respective items of content) in the EPG and/or presentation of the respective items of content, in part, by customizing the EPG based at least in part on the defined favorability criteria and preferences or selections of the user. For each time period (e.g., time slot) in the grid of the customized EPG, the customized EPG can present, via an interface (e.g., a display screen of the presentation component or communication device) a defined number of the most favorite items of content ranked from most favorite on downward to the lowest-ranked favorite that had been selected as a favorite by the user via an interface of the device, presentation component, communication device, remote control component, and/or application. In some implementations, the content manager component can execute the EPG to facilitate presentation of (e.g., automatic presentation of), at a first time period, the most favorite item of content associated with the first time period and a particular channel or source, at a second time period, the most favorite item of content associated with the second time period and the particular channel or source or another channel or source, and so on. As desired, the user also can use an interface (e.g., of the remote control component or other device) to select, on the customized EPG, another desired item of content (e.g., a second or third most favorite item of content), instead of the most favorite item of content, for presentation at a particular time period.

As another example, additionally or alternatively, the content manager component can control the presentation of the respective items of content (e.g., control presentation of program-related information relating to the respective items of content) in the EPG and/or presentation of the respective items of content, in part, by customizing the EPG based at least in part on the defined favorability criteria and respective popularity ratings of the respective items of content among a group of users. For each time period (e.g., time slot) in the grid of the customized EPG, the customized EPG can present, via an interface (e.g., a display screen) a defined number (e.g., 3, 5, 10, 20, or other desired number) of the most popular items of content ranked from most popular on downward to the lowest-ranked popular item of content of the set that had been determined to be the most popular items of content. In certain implementations, the content manager component can execute the EPG to facilitate presentation of (e.g., automatic presentation of), at a first time period, the most popular item of content associated with the first time period, at a second time period, the most popular item of content associated with the second time period, and so on. As desired, the user also can use an interface (e.g., of the remote control component or other device) to select, on the customized EPG, another desired item of content (e.g., a second or third most popular item of content), instead of the most popular item of content, for presentation at a particular time period.

FIG. 8 presents a flow chart of an example method 800 that can control presentation of information relating to items of content in an EPG and/or presentation of items of content to a user based at least in part on favorite items of content of a user, in accordance with various aspects and embodiments of the disclosed subject matter. The method 800 can be employed by, for example, a content manager component of or associated with the device.

At 802, an EPG, comprising data relating to respective items of content associated with respective time periods and respective content provider sources or channels, can be presented via an interface. The content manager component can generate the EPG. The content manager component can facilitate presenting the EPG to the user via the interface (e.g., a display screen of the presentation component or communication device) to facilitate customization of the EPG by the user.

At 804, selection information can be received via one or more interfaces from the user, wherein the selection information indicates selection of a subset of the respective items of content as favorites of the user. At 806, ranking information can be received via the one or more interfaces from the user, wherein the ranking information can indicate respective rankings (e.g., favorite rankings) of respective items of content of the subset of the respective items of content. The content manager component can receive the selection information and the ranking information via the one or more interfaces from the user. The one or more interfaces can comprise, for example, a touchscreen, a keypad or keyboard, a mouse, a trackpad, or other desired interface, that can facilitate selecting items of content in the EPG, moving (e.g., dragging and dropping) items of content from one location (e.g., an initial location or lower ranking location) to another location (e.g., a higher or highest ranking location) in the grid of the EPG. In some implementations, the operations at 804 and 806 can be performed simultaneously, wherein the user, via the one or more interfaces, selects and drags an item of content associated with a time period from one location (e.g., the original location of the item of content in the grid in relation to the time period and the channel or source associated with the item of content) and drops or releases the item of content in another location (e.g., a location associated with the time period and a favorites ranking desired (e.g., selected) by the user) in the grid.

At 808, the selection information and ranking information can be analyzed. The content manager component can analyze the selection information and ranking information to facilitate determining modifications the user is making to the EPG to select respective items of content in the subset of the respective items of content as favorites of the user, at the respective time periods of those favorite items of content, and rank those favorite items of content, in their respective time periods, relative to each other and/or to other items of content that were not selected as favorites by the user, in accordance with the ranking information.

At 810, the EPG can be modified to generate a modified EPG that can present, in a first portion of the grid of the EPG, information relating to respective favorite items of content of the user as favorites, in their respective time periods in the grid of the EPG, in accordance with their respective rankings (e.g., favorites rankings), and present, in a second portion of the grid of the EPG, information relating to the respective items of content in accordance with their associated respective time periods and respective channels or sources, based at least in part on the results of the analysis. The content manager component can modify information relating to the EPG to modify the EPG to generate the modified (e.g., customized) EPG. The modified EPG can present, in the first portion of the EPG grid, the information relating to the respective favorite items of content of the user as favorites, in their respective time periods in the grid of the modified EPG, in accordance with their respective rankings (e.g., favorites rankings), based at least in part on the results of the analysis. The modified EPG also can present, in the second portion of the EPG grid, the information relating to the respective items of content based at least in part on (e.g., in accordance with) their associated respective time periods and respective channels or sources. The information relating to the modified EPG can be stored in a data store associated with the content manager component (e.g., a data store in or associated with the content manager component and/or the device).

At 812, the modified EPG can be presented via the interface (e.g., the display screen) to the user. The content manager component can facilitate presenting the modified EPG via the interface to the user or otherwise making the modified EPG available to the user (e.g., when it is accessed by the user).

At 814, the modified EPG can be executed to facilitate presentation (e.g., automatic presentation) of at least a portion of the respective favorite items of content at the respective time periods of such favorite items of content, in accordance with the modified EPG. The content manager component can execute the modified EPG to facilitate the presentation of at least the portion of the respective favorite items of content at the respective time periods of such favorite items of content, in accordance with the modified EPG. For example, the content manager component can execute the modified EPG to facilitate presentation (e.g., via the presentation component or communication device) of a first item of content ranked as first-ranked (e.g., highest ranked) favorite for a first time period (e.g., 8:00 p.m. on Monday of a first date) at the first time period via the channel or source associated with (e.g., providing) the first item of content, presentation of a second item of content ranked as first-ranked (e.g., highest ranked) favorite for a second time period (e.g., 8:30 p.m. on Monday of the first date) at the second time period via the channel or source associated with (e.g., providing) the second item of content, and so on, without the user having to further interact with EPG (e.g., the modified EPG) or other interfaces or controls of the device or associated devices (e.g., presentation component, communication device, remote control component) in order to have at least the portion of the favorite items of content presented to the user. The channel(s) or source(s) providing the first item of content and the second item of content can be different channels or sources, or the same channels or sources.

FIG. 9 depicts a flow chart of still an example method 900 that can control presentation of information relating to items of content in an EPG and/or presentation of items of content to a user based at least in part on the relative popularity of the items of content, in accordance with various aspects and embodiments of the disclosed subject matter. The method 900 can be employed by, for example, an audio manager component of or associated with the device.

At 902, ranking data can be received from one or more data sources, wherein the ranking data can indicate rankings (e.g., popularity rankings) of respective items of content associated with respective time periods and content provider channels or sources. The content manager component (or another component) can receive the ranking data from the one or more data sources (e.g., from communication devices of the one or more data sources. The one or more data sources can comprise, for example, Nielsen Holdings PLC (which provides the Nielsen ratings), a data source(s) that collects data (e.g., viewing data) from STBs, social media sources, TiVo, TRA, Rentrak Corp., and/or another desired data source.

At 904, preference information relating to one or more user preferences of a user can be received via an interface(s) from the user, wherein the one or more user preferences can relate to presentation (e.g., customized presentation) of information relating to items of content in the EPG based at least in part on the respective popularity of the items of content. The content manager component can receive the preference information via the interface(s) from the user, wherein the user can use, for example, a touchscreen, mouse, buttons or controls, voice commands, etc., associated with the interface(s) to enter or input the preference information. The interface(s) can be part of or associated with the device, presentation component, communication device, and/or remote control component. The preference information can indicate, for example, the number of higher ranked (e.g., highest ranked, second highest ranked, third highest ranked, . . . ) items of content associated with respective time periods that the user desires to be presented in a portion (e.g., dedicated portion) of the grid of the EPG. For instance, the preference information can indicate that, for each time period in the grid of the EPG, the respective top 10 items of content are to be presented in the respective time periods in the grid of the EPG. As another example, as desired by the user, the preference information also can indicate that the user desires, with regard to each time period, a defined number of the most or more popular items of content of one or more certain genres (e.g., comedy, sports, and/or drama, . . . ) associated with that time period be presented in the EPG grid, while disregarding or discounting other items of content of other genres, even if such other items of content is otherwise popular.

At 906, the ranking data and the preference information can be analyzed. The content manager component can analyze the ranking data and the preference information to facilitate customizing the EPG to present certain (e.g., more popular) items of content with respect to their associated time periods of presentation in the grid of the EPG based at least in part on their respective popularity ranking.

At 908, a customized EPG can be generated based at least in part on the analysis results, wherein the customized EPG can present, in a first portion of the grid of the EPG, information relating to respective popular items of content associated the respective time periods, based at least in part on the respective popularity rankings of the respective popular items of content, and present, in a second portion of the grid of the EPG, information relating to the respective items of content in accordance with their associated respective time periods and respective channels or sources. The content manager component can generate the customized EPG based at least in part on the analysis results obtained from analyzing the ranking data and the preference information.

At 910, the customized EPG can be presented via an interface (e.g., the display screen of the presentation component or communication device) to the user. The content manager component can facilitate presenting the customized EPG via the interface to the user or otherwise making the customized EPG available to the user (e.g., when it is accessed by the user).

At 912, the customized EPG can be executed to facilitate presentation (e.g., automatic presentation) of at least a portion of the respective popular items of content at the respective time periods of such popular items of content, in accordance with the customized EPG. The content manager component can execute the customized EPG to facilitate the presentation of at least the portion of the respective popular (e.g., most popular) items of content at the respective time periods of such popular items of content, in accordance with the customized EPG. For example, the content manager component can execute the customized EPG to facilitate presentation (e.g., via the presentation component or communication device) of a first item of content ranked as first-ranked (e.g., highest ranked) in popularity for a first time period (e.g., 8:00 p.m. on Monday of a first date) at the first time period via the channel or source associated with (e.g., providing) the first item of content, presentation of a second item of content ranked as first-ranked (e.g., highest ranked) in popularity for a second time period (e.g., 8:30 p.m. on Monday of the first date) at the second time period via the channel or source associated with (e.g., providing) the second item of content, and so on, without the user having to further interact with EPG (e.g., the customized EPG) or other interfaces or controls of the device or associated devices (e.g., presentation component, communication device, remote control component) in order to have at least the portion of the popular items of content presented to the user. The channel(s) or source(s) providing the first item of content and the second item of content can be different channels or sources, or the same channels or sources.

Figure 10:
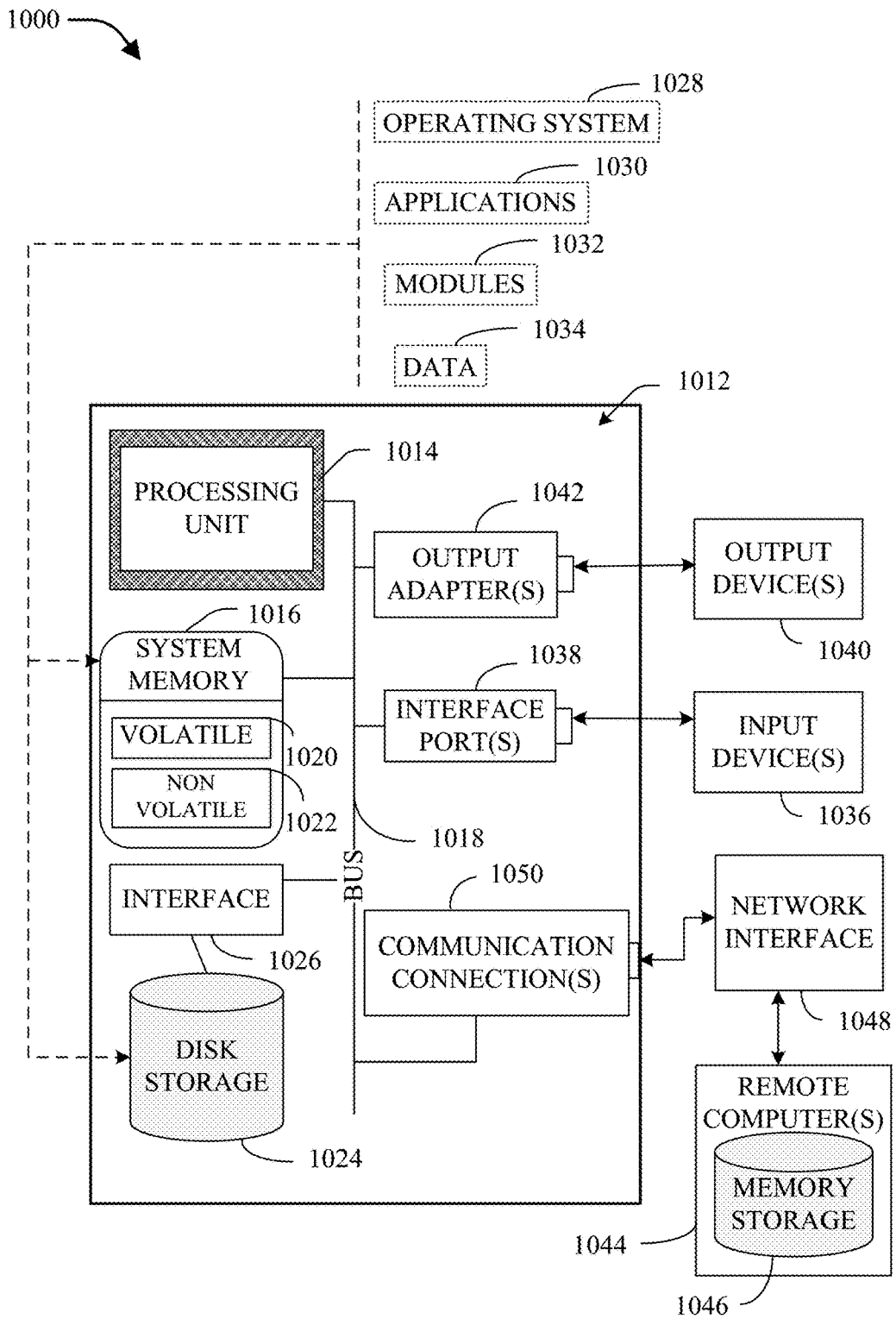
FIG. 10 is a schematic block diagram illustrating a suitable operating environment.
Figure 11:
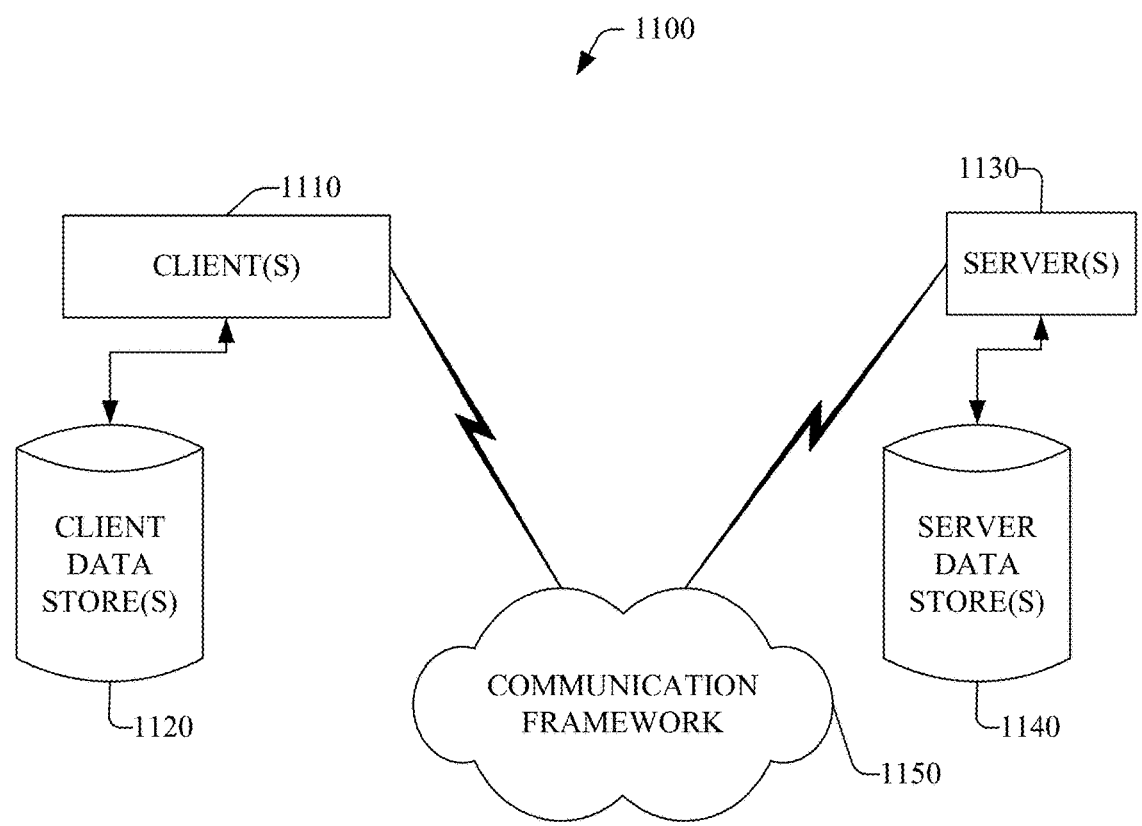
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., mobile phone, electronic tablets or pads, laptop computers, PDAs, . . . ), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 10, a suitable environment 1000 for implementing various aspects of this disclosure includes a computer 1012. The computer 1012 includes a processing unit 1014, a system memory 1016, and a system bus 1018. It is to be appreciated that the computer 1012 can be used in connection with implementing one or more of the systems, components, or methods shown and described in connection with FIGS. 1-9, or otherwise described herein. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 also includes removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

FIG. 10 also depicts software that acts as an intermediary between users and the basic computer resources described in the suitable operating environment 1000. Such software includes, for example, an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored, e.g., in system memory 1016 or on disk storage 1024. It is to be appreciated that this disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 (e.g., computing system) with which the subject matter of this disclosure can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing this disclosure, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

It is to be noted that aspects, features, and/or advantages of the disclosed subject matter can be exploited in substantially any wireless telecommunication or radio technology, e.g., Wi-Fi; Gi-Fi; Hi-Fi; Bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, communication device, presentation component, remote control component, content manager component, application, communication network, macro communication network, micro communication network, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

based on favorability-related information associated with a user identity and in accordance with a defined favorability criterion, determining, by a system comprising a processor, first items of content associated with respective time periods that are to be assigned a higher favorability than second items of content associated with the respective time periods, wherein the first items of content and the second items of content are respectively received from respective content provider devices associated with respective content provider identities, wherein the first items of content comprise a first item of content and a second item of content that are associated with a first time period of the respective time periods, wherein the first item of content is determined to be a favorite item of content of the user identity based on input information received from the user identity, and wherein the second item of content is determined to be a popular item of content among a group of user identities based on ratings information relating to respective popularity ratings of respective items of content, comprising the second item of content;

displacing, by the system, the popular item of content from a first favorability ranking to a second favorability ranking for the first time period, in response to assigning the first favorability ranking to the favorite item of content for the first time period based on the input information received from the user identity, wherein the first favorability ranking is higher than the second favorability ranking; and controlling, by the system, a first presentation of first information relating to the first items of content relative to a second presentation of second information relating to the second items of content in a third presentation of an electronic content guide with respect to the respective time periods based on the first items of content being determined to have the higher favorability than the second items of content, wherein, for the first time period, the first presentation of the first information presents a first information portion associated with the favorite item of content at the first favorability ranking and a second information portion associated with the popular item of content at the second favorability ranking.

2. The method of claim 1, further comprising:

in accordance with the electronic content guide, at the first time period of the respective time periods associated with the first item of content of the first items of content, receiving, by the system, the first item of content from one of the respective content provider devices via a channel; and communicating, by the system, the first item of content to a presentation component to facilitate a fourth presentation of the first item of content.

3. The method of claim 1, further comprising:

arranging, by the system, respective first information portions of the first information relating to the first items of content in relation to each other in a first portion of the third presentation of the electronic content guide based on the respective time periods associated with the first items of content and respective favorability rankings of the first items of content, in accordance with the favorability-related information and the defined favorability criterion, wherein the respective first information portions comprise the first information portion and the second information portion, and wherein the respective favorability rankings comprise the first favorability ranking and the second favorability ranking.

4. The method of claim 3, wherein the third presentation of the electronic content guide comprises a grid comprising a column associated with the first time period, and wherein the arranging the respective first information portions of the first information relating to the first items of content comprises arranging the first information portion relating to the first item of content higher than the a second information portion relating to the second item of content in the column of the grid of the electronic content guide based on the first item of content being determined to have the first favorability ranking that is higher than the second favorability ranking of the second item of content based on the favorability-related information and the defined favorability criterion.

5. The method of claim 3, further comprising:
arranging, by the system, respective second information portions of the second information relating to the second items of content in relation to each other in a second portion of the third presentation of the electronic content guide based on the respective time periods associated with the second items of content and respective channels associated with the second items of content, wherein at least a third portion of the second items of content are determined not to satisfy the defined favorability criterion based on the favorability-related information.

6. The method of claim 1, further comprising:
receiving, by the system, at least a portion of the favorability-related information via an interface from a device associated with the user identity, wherein the favorability-related information indicates favorite items of content that are favored by the user identity, wherein the favorability-related information comprises the input information, and wherein the favorite items of content comprises the favorite item of content; and
analyzing, by the system, the favorability-related information to facilitate the determining the first items of content associated with the respective time periods that have higher favorability than the second items of content associated with the respective time periods.

7. The method of claim 1, further comprising:
receiving, by the system, at least a portion of the favorability-related information from a device associated with a data service identity, wherein the favorability-related information indicates that at least a portion of the first items of content are more popular among the group of user identities relative to the second items of content, and wherein the portion of the favorability-related information comprises the ratings information; and
analyzing, by the system, the favorability-related information to facilitate the determining the first items of content associated with the respective time periods that have higher favorability than the second items of content associated with the respective time periods.

8. The method of claim 7, wherein the portion of the favorability-related information is a first portion, wherein the favorability-related information comprises preference information relating to a preference of the user identity to have a defined number of items of content of the first time period presented as popular items of content in a second portion of the third presentation of the electronic content guide relating to the popular items of content, and wherein the controlling further comprises:
in accordance with the favorability-related information, controlling the first presentation of the first information relating to the first items of content in the second portion of the third presentation of the electronic content guide with respect to the respective time periods to have a first number of respective first information portions of the first information relating to the first items of content presented in a first guide portion of the electronic content guide associated with the first time period and a second number of respective second information portions of the second information relating to the second items of content presented in a second guide portion of the electronic content guide associated with a second time period of the respective time periods, wherein the first number and the second number are a same number as the defined number.

9. The method of claim 7, wherein the favorability-related information comprises first favorability-related information relating to respective popularities of the first items of content as compared to each other and the second items of content, and second favorability-related information relating to genres of content, and wherein the determining the first items of content associated with respective time periods that have higher favorability than the second items of content associated with the respective time periods further comprises:
determining the first items of content associated with the respective time periods that have higher favorability than the second items of content associated with the respective time periods, based on the first favorability-related information and the second favorability-related information, in accordance with the defined favorability criterion.

10. The method of claim 1, wherein the first items of content comprise the first item of content associated with the first time period of the respective time periods and a third item of content associated with a second time period of the respective time periods that occurs after the first time period, and wherein the method further comprises:
executing, by the system, the electronic content guide to facilitate a first content presentation of the first item of content during the first time period and a second content presentation of the third item of content during the second time period.

11. A system, comprising:
a processor; and
a memory that stores executable instructions that, when executed by the processor, facilitate performance of operations, comprising:
determining first items of content associated with respective time periods that have higher rankings than second items of content associated with the respective time periods, based on favorability-related data associated with a user identity and in accordance with a defined favorability criterion, wherein respective items of content of the first items of content and the second items of content are associated with respective content provider devices associated with respective content provider identities, wherein the first items of content comprise a first item of content and a second item of content that are associated with a first time period of the respective time periods, wherein the first item of content is determined to be a favorite item of content of the user identity based on input data received from the user identity, and wherein the second item of content is determined to be a popular item of content among a group of user identities based on ratings data relating to respective popularity ratings of respective items of content, comprising the second item of content;

moving the popular item of content from a first ranking to a second ranking for the first time period, in response to selecting the first favorite item of content to have the first ranking for the first time period based on the input data received from the user identity, wherein the first ranking is higher than the second ranking; and managing generation of electronic program guide data representative of an electronic program guide to facilitate presentation of first data relating to the first items of content in a first portion of the electronic program guide with respect to the respective time periods based on the first items of content associated with the respective time periods being determined to have the higher rankings than the second items of content associated with the respective time periods, wherein, with respect to the first time period, the presentation of the first data presents a first data portion associated with the favorite item of content at the first ranking and a second data portion associated with the popular item of content at the second ranking.

12. The system of claim 11, wherein the operations further comprise:
organizing respective first data portions of the first data relating to respective first content items of the first items of content with respect to each other in the first portion of the electronic program guide and with respect to second data relating to the second items of content in a second portion of the electronic program guide, based on the respective time periods associated with the first items of content and the second items of content and further based on respective rankings of the first items of content, in accordance with the favorability-related data and the defined favorability criterion, wherein the respective first data portions comprise the first data portion and the second data portion, and wherein the respective rankings comprise the first ranking and the second ranking.

13. The system of claim 12, wherein the operations further comprise:
organizing respective second data portions of the second data relating to respective second content items of the second items of content with respect to each other in the second portion of the electronic program guide based on the respective time periods associated with the second items of content and respective channels associated with the second items of content, and wherein at least a third portion of the second items of content are determined not to satisfy the defined favorability criterion based on the favorability-related data.

14. The system of claim 12, wherein the first item of content is associated with the first ranking of the respective rankings and the second item of content is associated with the second ranking of the respective rankings,
wherein the electronic program guide data comprises grid data representative of a grid comprising a column associated with the first time period of the respective time periods, and
wherein the organizing the respective first data portions of the first data relating to the respective first content items of the first items of content with respect to each other in the first portion of the electronic program guide and with respect to the second data relating to the second items of content in the second portion of the electronic program guide comprises:
organizing the first data portion of the first data relating to the first item of content and the second data portion of the first data relating to the second item of content to have the first data portion of the first data relating to the first item of content higher than the second data portion of the first data relating to the second item of content in the column of the grid in the first portion of the electronic program guide based on the first item of content being determined to have the first ranking that is higher than the second ranking of the second item of content based on the favorability-related data and the defined favorability criterion.

15. The system of claim 12, wherein the operations further comprise:
receiving at least a third portion of the favorability-related data via an interface from a device associated with the user identity, wherein the favorability-related data indicates favorite items of content of the user identity, wherein the third portion of the favorability-related data comprises the input data, and wherein the favorite items of content comprise the favorite item of content; and
analyzing at least the third portion of the favorability-related data to facilitate the determining the first items of content associated with the respective time periods that have the higher rankings than the second items of content associated with the respective time periods.

16. The system of claim 12, wherein the operations comprise:
receiving at least a third portion of the favorability-related data from a device associated with a data service identity, wherein the favorability-related data indicates that at least a fourth portion of the first items of content are more popular among group of user identities, comprising the user identity, as compared to the second items of content, and wherein the third portion of the favorability-related data comprises the ratings data; and
analyzing at least the third portion of the favorability-related data to facilitate the determining the first items of content associated with the respective time periods that have higher rankings than the second items of content associated with the respective time periods.

17. The system of claim 11, wherein the first items of content comprise the first item of content associated with the first time period of the respective time periods and a third item of content associated with a second time period of the respective time periods that occurs subsequent to the first time period, and wherein the operations further comprises:
executing information relating to the electronic program guide to facilitate a first presentation of the first item of content during the first time period and a second presentation of the third item of content during the second time period.

18. The system of claim 11, wherein the system comprises a device that facilitates management and generation of the electronic program guide, and wherein the device is a member of a group of devices comprising a set-top box, a computer, a media player device, an electronic tablet, an electronic pad, a mobile phone, and an electronic gaming device.

19. A non-transitory machine-readable storage medium, comprising executable instructions that, when executed by a processor, facilitate performance of operations, comprising:

based on favorability-related information associated with a user identity and in accordance with a defined favorability criterion, determining first items of content associated with respective time periods that have higher favorability rankings than second items of content associated with the respective time periods, wherein the first items of content and the second items of content are associated with respective content provider devices, wherein the first items of content comprise a first item of content and a second item of content that are associated with a time period of the respective time periods, wherein the first item of content is determined to be one favorite item of content of a first group of favorite items of content associated with the user identity based on input information received from the user identity and indicating that the first item of content is the one favorite item of content, and wherein the second item of content is determined to be a popular item of content among a second group of user identities based on content popularity information relating to respective popularities of respective items of content, comprising the second item of content;

modifying a first favorability ranking of the popular item of content to a second favorability ranking for the time period, in response to assigning the first favorability ranking to the one favorite item of content for the time period based on the input information received from the user identity, wherein the first favorability ranking is higher than the second favorability ranking; and controlling a first presentation of first information relating to the first items of content relative to a second presentation of second information relating to the second items of content in a display of an electronic content guide with respect to the respective time periods based on the first items of content being determined to have higher favorability rankings than the second items of content, wherein, for the time period, the first presentation of the first information presents first item information associated with the one favorite item of content in accordance with the first ranking and second item information associated with the popular item of content in accordance with the second ranking.

20. The non-transitory machine-readable storage medium of claim 19, wherein the operations further comprise:

in accordance with the favorability-related information and the defined favorability criterion, based on the respective time periods associated with the first items of content and the second items of content, and further based on respective favorability rankings of respective content items of the first items of content, arranging the respective content items of the first items of content in relation to each other in a first portion of the display of the electronic content guide and in relation to the second items of content in a second portion of the display of the electronic content guide, wherein the respective content items comprise the first item of content and the second item of content, and wherein the respective favorability rankings comprise the first favorability ranking and the second favorability ranking.

* * * * *